(12) United States Patent
Bauer et al.

(10) Patent No.: US 8,087,767 B2
(45) Date of Patent: Jan. 3, 2012

(54) INKJET INK SET

(75) Inventors: Richard Douglas Bauer, Kennett Square, PA (US); Kenneth Gene Moloy, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 961 days.

(21) Appl. No.: 11/715,610

(22) Filed: Mar. 8, 2007

(65) Prior Publication Data

US 2007/0211126 A1 Sep. 13, 2007

Related U.S. Application Data

(60) Provisional application No. 60/780,706, filed on Mar. 9, 2006.

(51) Int. Cl.
*C09D 11/00* (2006.01)
(52) U.S. Cl. ..................... 347/100; 106/31.13
(58) Field of Classification Search .................. 347/100; 106/31.13
See application file for complete search history.

(56) References Cited

U.S. PATENT DOCUMENTS

| | | | |
|---|---|---|---|
| 4,694,302 | A | 9/1987 | Hackleman et al. |
| 6,020,397 | A | 2/2000 | Matzinger |
| 6,503,307 | B1 * | 1/2003 | Noguchi .................... 106/31.27 |
| 2002/0156153 | A1 | 10/2002 | Tsang et al. |
| 2003/0064206 | A1 * | 4/2003 | Koyano et al. ................ 428/195 |
| 2003/0103121 | A1 * | 6/2003 | Tomioka et al. .............. 347/100 |
| 2004/0061753 | A1 * | 4/2004 | Chen et al. .................... 347/100 |
| 2007/0277699 | A1 * | 12/2007 | Bauer .......................... 106/31.6 |

FOREIGN PATENT DOCUMENTS

| | | |
|---|---|---|
| WO | WO 01/36547 A1 | 5/2001 |
| WO | WO 2006/066033 A1 | 6/2006 |

OTHER PUBLICATIONS

PCT International Search Report and Written Opinion for International Application No. PCT/US2007/006008 dated Jul. 6, 2007.

* cited by examiner

*Primary Examiner* — Laura Martin
(74) *Attorney, Agent, or Firm* — Simon L. Xu

(57) ABSTRACT

An ink set is provided which produces a printed article having excellent physical durability. The ink set contains a first liquid composition containing a reactive carbonyl group and a second liquid composition containing a co-reactive amine group, at least one of the first liquid composition and the second liquid composition further containing a coloring material. When the two inks are printed on a substrate in at least a partially overlapping arrangement, the reactive amine and reactive carbonyl species can crosslink to form a more durable image.

13 Claims, 13 Drawing Sheets

R = H, Me

R = H, Me

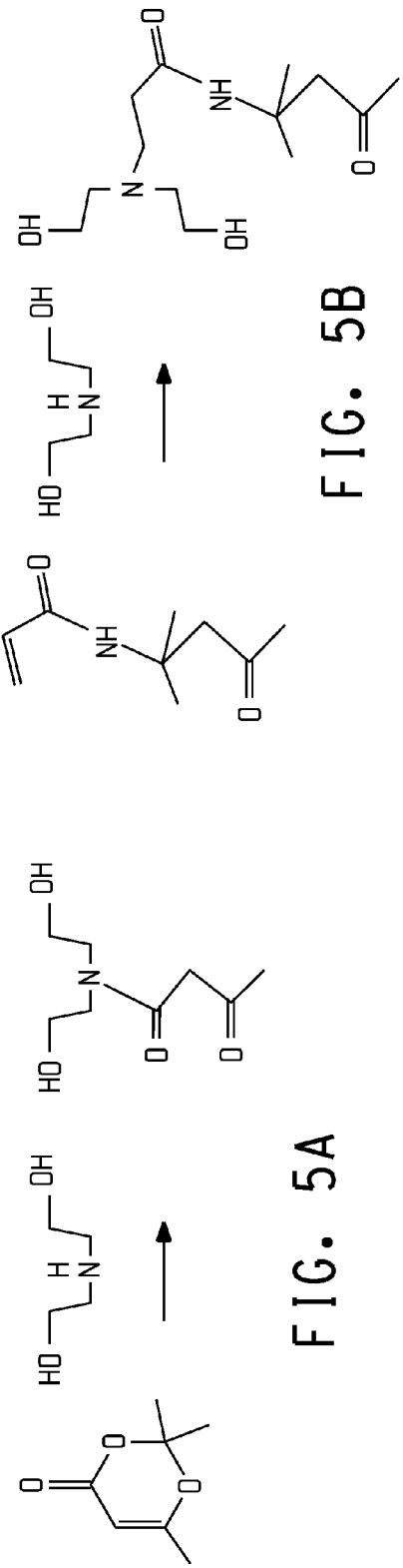
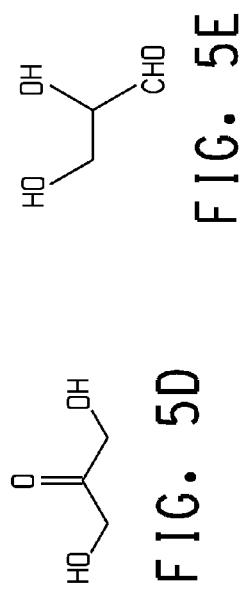
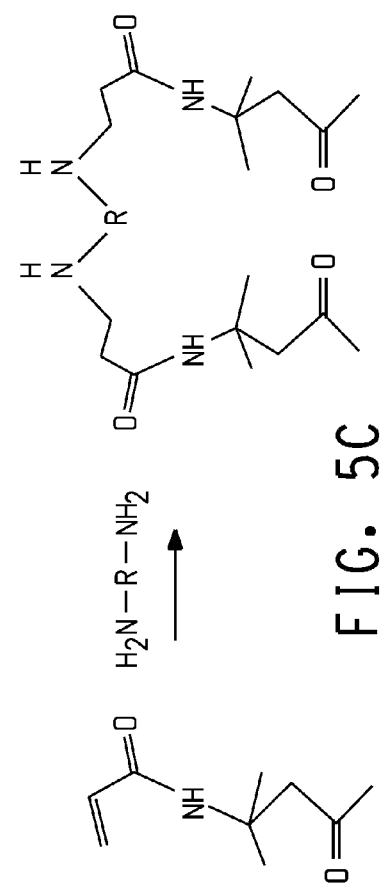
FIG. 5A
FIG. 5B
FIG. 5C
FIG. 5D
FIG. 5E
Continued on Fig. 5F

INKJET INK SET

CROSS-REFERENCE TO RELATED APPLICATION

This application claims priority under 35 U.S.C. §119 from U.S. Provisional Application Ser. No. 60/780,706, filed Mar. 9, 2006 which is hereby incorporated by reference in its entirety.

BACKGROUND OF THE INVENTION

The present invention pertains to an ink set comprising at least two inks wherein one ink comprises a reactive carbonyl-group(s) containing species and a second ink comprises a reactive amine groups containing species. When the two inks are printed on a substrate in an overlapping arrangement, the reactive amine and reactive carbonyl species can crosslink to form a more durable image.

Inkjet printing is a non-impact printing process in which droplets of ink are deposited on print media, such as paper, to form the desired image. The droplets are ejected from a printhead in response to electrical signals generated by a microprocessor. Inks used in such recording are subject to rigorous demands including, for example, good dispersion stability, ejection stability, and good fixation to media.

Inkjet printers offer low cost, high quality printing and have become a popular alternative to other types of printers such as laser printers. However, inkjet printers are presently unable to match the speed of laser printers and the durability of the laser printed images. Inkjet prints with increased durability would be highly advantageous.

With regard to increasing durability of inkjet prints, U.S. Pat. No. 4,694,302 describes a two pen configuration wherein one pen contains aluminum chloride in aqueous vehicle and the second pen contains a colored ink with carboxymethyl cellulose (CMC) in aqueous vehicle. When jetted together on a substrate, an insoluble salt of CMC is formed, producing a protective coating. The print was reported to be very water-fast.

U.S. Pat. No. 6,020,397 describes an inkjet printing process wherein a first liquid comprising aziridine and a second liquid comprising a polymer reactive with aziridine are sequentially applied to a substrate, thereby forming an aziridine-crosslinked polymer. Good ink adhesion was reported.

U.S. Pat. No. 6,503,307 describes a set of liquid compositions wherein a first liquid comprises a first water-soluble compound having an ethylenically unsaturated double bond with an alpha-electron withdrawing group and a second liquid comprises a second water soluble compound having an active hydrogen addable to the first compound. Colorant can be present in either liquid. When printed together on a substrate, the first and second liquids can react to form a polymeric film. Water and abrasion resistance are reported to be excellent.

U.S. Published Application No. 2002/0156153 describes a two part fixative comprising (1) a reactive monomer or oligomer, selected from the group of isocyanates and epoxy terminated oligomers, in a vehicle and (2) at least one second component, selected from polyols and polyvinyl alcohols, and base catalyst. The reactive monomer or oligomer reacts with the second component on the print medium to form a polymer. Water-, smear- and smudge-fastness are reported to be enhanced.

Still there is a need for, and it is an objective of this invention to provide, inks and printing methods that provide more physically durable inkjet images.

SUMMARY OF THE INVENTION

In accordance with one aspect of the present invention, there is provided an inkjet ink set comprising at least two inks:
a) a first ink comprising a vehicle and a reactive carbonyl-group(s) containing species having at least one (preferably at least two) reactive carbonyl groups; and
b) a second ink comprising a vehicle and a reactive amine groups containing species having at least one (preferably at least two) reactive amine groups.

The reactive carbonyl-group(s) containing species and the reactive amine groups containing species in the first ink are so named because they are mutually reactive and can crosslink.

The reactive carbonyl-group(s) containing species and the reactive amine-group(s) containing species can be present in the respective inks in any desired form. For example, each species can be present, independently, as an additive, or associated with a colorant such as a dispersant adsorbed on a pigment or a species chemically attached to the colorant.

The reactive carbonyl moieties as prescribed herein include the carbonyl of aldehyde, ketone, beta diketone and beta keto ester moieties. A reactive carbonyl moiety also includes an imine or enamine forms which can be in equilibrium with the carbonyl when amines are present in solution. The reactive carbonyl moiety can also be present as a ketal or acetal, which is stable in neutral or slightly alkaline solution but reverts to the reactive ketone or aldehyde in the presence of acid.

The reactive amines as prescribed herein include hydrazine, hydrazide, hydrazone, semicarbazide, carbazide (or carbohydrazide) moieties.

In yet another aspect the present invention, pertains to a method for ink jet printing onto a substrate, comprising the steps, in any workable order, of:
(a) providing an ink jet printer that is responsive to digital data signals;
(b) loading the printer with a substrate to be printed;
(c) loading the printer with an ink jet ink set as set forth above and described in further detail below; and
(d) printing onto the substrate using the ink or inkjet ink set in response to the digital data signals.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

BRIEF DESCRIPTION OF THE DRAWINGS

FIGS. 3, 4a-b, 5a-f, 6a-c, and 7 show various synthetic routes to form other types of polycarbonyl polymers.

DETAILED DESCRIPTION OF THE PREFERRED EMBODIMENTS

Vehicle

Figure 1:
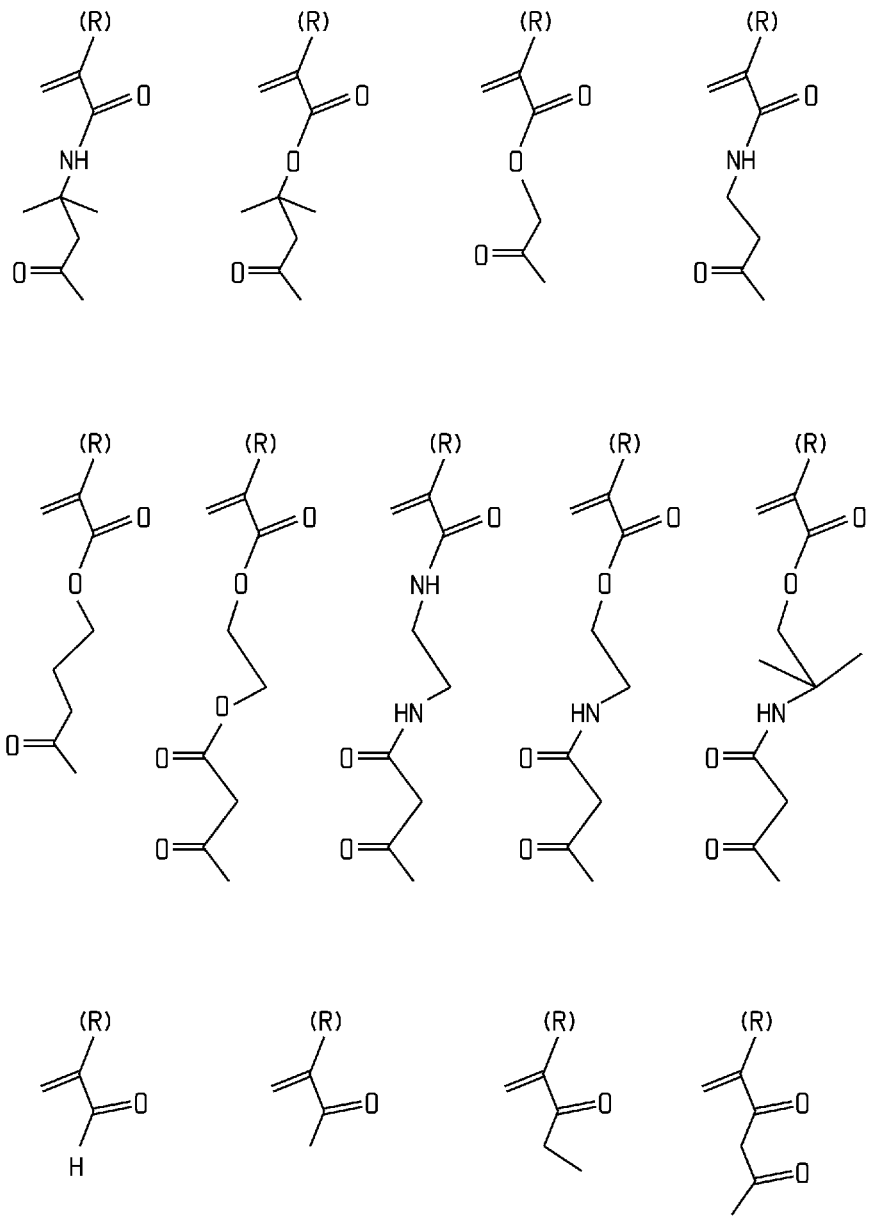
FIG. 1 is a schematic view of various acrylic monomers that can be used to prepare polycarbonyl acrylic polymers containing reactive carbonyl groups, useful in the practice of this invention.

The vehicle is the liquid carrier (or medium) and can be aqueous or nonaqueous.

The term "aqueous vehicle" refers to water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (the disclosure of which is incorporated by reference herein for all purposes as if fully set forth).

If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

The aqueous vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-$C_{4-6}$ alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

"Nonaqueous vehicle" refers to a vehicle that is substantially comprised of a nonaqueous solvent or mixtures of such solvents, which solvents can be polar and/or nonpolar. Examples of polar solvents include alcohols, esters, ketones and ethers, particularly mono- and di-alkyl ethers of glycols and polyglycols such as monomethyl ethers of mono-, di- and tri-propylene glycols and the mono-n-butyl ethers of ethylene, diethylene and triethylene glycols. Examples of nonpolar solvents include aliphatic and aromatic hydrocarbons having at least six carton atoms and mixtures thereof including refinery distillation products and by-products.

Even when no water is deliberately added to the nonaqueous vehicle, some adventitious water may be carried into the formulation, but generally this will be no more than about 2-4%. By definition, the nonaqueous ink of this invention will have no more than about 10%, and preferably no more than about 5%, by weight of water based on the total weight of the nonaqueous vehicle.

Colorants

Colorants can be soluble (dyes) or dispersed (pigments) in the ink vehicle.

Traditionally, pigments are stabilized to dispersion in a vehicle by means of dispersing agents, such as polymeric dispersants or surfactants. More recently though, so-called "self-dispersible" or "self-dispersing" pigments (hereafter "SDP") have been developed. As the name would imply, SDPs are dispersible in water, or vehicle, without dispersants. See, for example, U.S. Pat. No. 5,554,739, U.S. Pat. No. 5,571,311, U.S. Pat. No. 5,609,671, U.S. Pat. No. 5,672,198, U.S. Pat. No. 5,698,016, U.S. Pat. No. 5,707,432, U.S. Pat. No. 5,718,746, U.S. Pat. No. 5,747,562, U.S. Pat. No. 5,749,950, U.S. Pat. No. 5,803,959, U.S. Pat. No. 5,837,045, U.S. Pat. No. 5,846,307, U.S. Pat. No. 5,851,280, U.S. Pat. No. 5,861,447, U.S. Pat. No. 5,885,335, U.S. Pat. No. 5,895,522, U.S. Pat. No. 5,922,118, U.S. Pat. No. 5,928,419, U.S. Pat. No. 5,976,233, U.S. Pat. No. 6,057,384, U.S. Pat. No. 6,099,632, U.S. Pat. No. 6,123,759, U.S. Pat. No. 6,153,001, U.S. Pat. No. 6,221,141, U.S. Pat. No. 6,221,142, U.S. Pat. No. 6,221,143, U.S. Pat. No. 6,277,183, U.S. Pat. No. 6,281,267, U.S. Pat. No. 6,329,446, U.S. Pat. No. 6,332,919, U.S. Pat. No. 6,375,317, US2001/0035110, EP-A-1086997, EP-A-1114851, EP-A-1158030, EP-A-1167471, EP-A-1122286, WO01/10963, WO01/25340 and WO01/94476.

A pigment may be stabilized to dispersion by surface treatment to be self-dispersing (see, for example, previously mentioned WO01/94476), by treatment with dispersant in the traditional way, or by some combination of surface treatment and dispersant.

Preferably, when a dispersant is employed, the dispersant(s) is a random or structured polymeric dispersant. Preferred random polymers include acrylic polymer and styrene-acrylic polymers. Most preferred are structured dispersants which include AB, BAB and ABC block copolymers, branched polymers and graft polymers. Some useful structured polymers are disclosed in U.S. Pat. No. 5,085,698, EP-A-0556649 and U.S. Pat. No. 5,231,131.

An example of a pigment dispersion made with block co-polymers containing both carboxylate and primary amine functionalities is described in U.S. Pat. No. 6,306,994.

The preceding dispersion examples are predominantly anionically stabilized. Examples of cationically stabilized dispersions include those made with quaternary polymer such as block polymers of methyl methacrylate and dimethylaminoethyl-methacrylate or benzyl methacrylate and dimethylaminoethylmethacrylate that have been quaternized with benzyl chloride, dimethyl sulfate, or methyl chloride. The preparation of such pigment dispersions is described in U.S. Pat. No. 5,801,738, U.S. Pat. No. 5,750,594 and U.S. Pat. No. 5,713,993.

Examples of quaternary self-dispersed pigments include those with pendant quaternized amine groups. The preparation of such pigments is described in U.S. Pat. No. 5,851,280 and U.S. Pat. No. 6,221,143.

Representative commercial pigments in dry form include the following:

| Trade Name | Manufacturer | Color Index (CI) Pigment Name |
|---|---|---|
| Permanent Yellow DHG | Hoechst | Yellow 12 |
| Permanent Yellow GR | Hoechst | Yellow 13 |
| Permanent Yellow G | Hoechst | Yellow 14 |
| Permanent Yellow NCG-71 | Hoechst | Yellow 16 |
| Permanent Yellow NCG-71 | Hoechst | Yellow 16 |
| Permanent Yellow GG | Hoechst | Yellow 17 |
| Hansa Yellow RA | Hoechst | Yellow 73 |
| Hansa Brilliant Yellow 5GX-02 | Hoechst | Yellow 74 |
| Dalamar ® Yellow YT-858-D | Heubach | Yellow 74 |
| Hansa Yellow X | Hoechst | Yellow 75 |
| Novoperm ® Yellow HR | Hoechst | Yellow 83 |
| Chromophtal ® Yellow 3G | Ciba-Geigy | Yellow 93 |
| Chromophtal ® Yellow GR | Ciba-Geigy | Yellow 95 |
| Novoperm ® Yellow FGL | Hoechst | Yellow 97 |
| Hansa Brilliant Yellow 10GX | Hoechst | Yellow 98 |
| Permanent Yellow G3R-01 | Hoechst | Yellow 114 |
| Chromophtal ® Yellow 8G | Ciba-Geigy | Yellow 128 |
| Irgazin ® Yellow 5GT | Ciba-Geigy | Yellow 129 |
| Hostaperm ® Yellow H4G | Hoechst | Yellow 151 |
| Hostaperm ® Yellow H3G | Hoechst | Yellow 154 |
| L74-1357 Yellow | Sun Chem | |
| L75-1331 Yellow. | Sun Chem | |
| L75-2377 Yellow | Sun Chem. | |
| Hostaperm ® Orange GR | Hoechst | Orange 43 |
| Paliogen ® Orange | BASF | Orange 51 |
| Irgalite ® Rubine 4BL | Ciba-Geigy | Red 57:1 |
| Quindo ® Magenta | Mobay | Red 122 |
| Indofast ® Brilliant Scarlet | Mobay | Red 123 |
| Hostaperm .RTM. Scarlet GO | Hoechst | Red 168 |
| Permanent Rubine F6B | Hoechst | Red 184 |
| Monastral ® Magenta | Ciba-Geigy | Red 202 |
| Heliogen .RTM. Blue L 6901F | BASF | Blue 15:2 |
| Heliogen ® Blue NBD 7010 | BASF | |
| Heliogen ® Blue K 7090 | BASF | Blue 15:3 |
| Heliogen ® Blue L 7101F | BASF | Blue 15:4 |
| Paliogen ® Blue L 6470 | BASF | Blue 60 |
| Heucophthal ® Blue G, XBT-583D | Heubach | Blue 15:3 |
| Heliogen ® Green K 8683 | BASF | Green 7 |
| Heliogen ® Green L 9140 | BASF | Green 36 |
| Monastral ® Violet R | Ciba-Geigy | Violet 19 |
| Monastral ® Red B | Ciba-Geigy | Violet 19 |
| Quindo ® Red R6700 | Mobay | |
| Quindo ® Red R6713 | Mobay | |
| Indofast ® Violet | Mobay | Violet 23 |
| Monastral ®. Violet Maroon B | Ciba-Geigy | Violet 42 |
| Special Black 4A | Degussa | Black 7 |
| Sterling ® NS 76 Black | Cabot | Black 7 |
| Sterling ® NSX 76 | Cabot | Black 7 |
| Mogul L | Cabot | Black 7 |

Representative commercial pigments available in the form of a water-wet presscake include: Heucophthal® Blue BT-585-P, Toluidine Red Y (C.I. Pigment Red 3), Quindo® Magenta (Pigment Red 122), Magenta RV-6831 presscake (Mobay Chemical, Harmon Division, Haledon, N.J.), Sunfast®). Magenta 122 (Sun Chemical Corp., Cincinnati, Ohio), Indo® Brilliant Scarlet (Pigment Red 123, C.I. No. 71145), Toluidine Red B (C.I. Pigment Red 3), Watchung® Red B (C.I. Pigment Red 48), Permanent Rubine F6B13-1731 (Pigment Red 184), Hansa® Yellow (Pigment Yellow 98), Dalamar® Yellow YT-839-P (Pigment Yellow 74, C.I. No. 11741, Sunbrite.® Yellow 17 (Sun Chemical Corp, Cincinnati, Ohio), Toluidine Yellow G (C.I. Pigment Yellow 1), Pigment Scarlet (C.I. Pigment Red 60), Auric Brown (C.I. Pigment Brown 6), etc. Black pigments, such as carbon black, generally are not available in the form of aqueous presscakes.

Cationic dyes typically have a structural skeleton of cyanine, azo, azomethine, xanthene, triphenylmethane, methine, polymethine, phthalocyanine, or the like. Cationic dyes include C.I. Basic Yellow 1, C.I. Basic Yellow 11, C.I. Basic Yellow 13, C.I. Basic Yellow 19, C.I. Basic Yellow 21, C.I. Basic Yellow 25, C.I. Basic Yellow 33, C.I. Basic Yellow 36, C.I. Basic Red 1, C.I. Basic Red 2, C.I. Basic Red 9, C.I. Basic Red 12, C.I. Basic Red 13, C.I. Basic Red 38, C.I. Basic Red 39, C.I. Basic Red 92, C.I. Basic Blue 1, C.I. Basic Blue 3, C.I. Basic Blue 5, C.I. Basic Blue 9, C.I. Basic Blue 19, C.I. Basic Blue 24, C.I. Basic Blue 25, C.I. Basic Blue 26, C.I. Basic Blue 28, C.I. Basic Blue 45, C.I. Basic Blue 54, and C.I. Basic Blue 65. These dyes may be used in combination for preparation of a black ink.

Anionic dyes include Acid Yellow 11, Acid Yellow 17, Acid Yellow 23, Acid Yellow 25, Acid Yellow 29, Acid Yellow 42, Acid Yellow 49, Acid Yellow 61, Acid Yellow 71, Direct Yellow 12, Direct Yellow 24, Direct Yellow 26, Direct Yellow 44, Direct Yellow 86, Direct Yellow 87, Direct Yellow 98, Direct Yellow 100, Direct Yellow 130, Direct Yellow 86, Direct Yellow 132, Direct Yellow 142, Acid Red 1, Acid Red 6, Acid Red 8, Acid Red 32, Acid Red 35, Acid Red 37, Acid Red 51, Acid Red 52, Acid Red 80, Acid Red 85, Acid Red 87, Acid Red 92, Acid Red 94, Acid Red 115, Acid Red 180, Acid Red 254, Acid Red 256, Acid Red 289, Acid Red 315, Acid Red 317, Direct Red 1, Direct Red 4, Direct Red 13, Direct Red 17, Direct Red 23, Direct Red 28, Direct Red 31, Direct Red 62, Direct Red 79, Direct Red 81, Direct Red 83, Direct Red 89, Direct Red 227, Direct Red 240, Direct Red 242, Direct Red 243, Acid Blue 9, Acid Blue 22, Acid Blue 40, Acid Blue 59, Acid Blue 93, Acid Blue 102, Acid Blue 104, Acid Blue 113, Acid Blue 117, Acid Blue 120, Acid Blue 167, Acid Blue 229, Acid Blue 234, Acid Blue 254, Direct Blue 6, Direct Blue 22, Direct Blue 25, Direct Blue 71, Direct Blue 78, Direct Blue 86, Direct Blue 90, Direct Blue 106, Direct Blue 199.

The black colorant may also be a dye as, for example, the black dye disclosed in U.S. Pat. No. 5,753,016. The black colorant may also be a combination of dye and pigment as, for example, disclosed in previously mentioned U.S. Pat. No. 6,277,184.

Additives

Other ingredients, additives, may be formulated into the inkjet ink, to the extent that such other ingredients do not interfere with the stability and jetability of the ink, which may be readily determined by routine experimentation. Such other ingredients are in a general sense well known in the art.

Biocides may be used to inhibit growth of microorganisms.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

The inks can contain compatible polymers other than pCDI and co-reactive species. The oligomers or polymers can be based on acrylic, urethane, polyester, polyamide, polyvinyl, polyether, polyamine and cellulosic structures; the polymer or oligomer structures can include random, block, branched, star or dendrimer structures. They can be soluble, or present as a dispersion, latex or hydrosol. The latex or dispersion particles can have a homogeneous or core/shell structure.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C. (30 cP or less), but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the inkjet-printing device it comes in contact with, and it should be essentially odorless and non-toxic.

The ink set of this invention can be particularly advantageous for applications where low viscosity is required. Thus the viscosity (at 25° C.) of the inventive inks can be less than about 7 cps, or less than about 5 cps, and even less than about 3.5 cps.

Proportions of Ingredients

The components described above and below (co-reactive components) can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

For example, the amount of vehicle in an ink, whether aqueous or non-aqueous, is typically in the range of about 70% to about 99.8%, and preferably about 80% to about 99.8%, based on total weight of the ink.

In a colored ink, colorant will generally be present in amounts up to about 12%, and more typically in the range of about 0.1 to about 9%, by weight of the total ink. Dispersants, when needed for stabilization of an insoluble colorant, are employed at levels based on the amount of colorant and are usually expressed as a weight ratio. Generally, dispersants are employed at a pigment-to-dispersant weight ratio in the range of about 1:3 to about 4:1.

Other ingredients (additives), when present, generally comprise less than about 15% by weight, based on the total weight of the ink. Surfactants, when added, are generally in the range of about 0.2 to about 3% by weight based on the total weight of the ink. Polymers can be added as needed, but will generally be less than about 15% by weight based on the total weight of the ink.

Reactive Carbonyl-Group(s) Containing Species

Reactive carbonyl-group(s) containing species comprise one or more reactive carbonyl moiety. The reactive carbonyl moieties as prescribed herein include the carbonyl of aldehyde, ketone, or a structure in which the aldehyde or ketone group is activated by an electron withdrawing group (EWD) in the beta position. The EWD can be a carbonyl group, as in a beta diketone, or an ester or amide as in a beta keto ester or amide. The EWD can also be a nitrile group, an SO group, an $SO_2$ group, a $SO_3$ group, a $SO_2NH$ group, a PO group, a $PO_3$ group, or a $PO_2NH$ group. It should be noted that the point of attachment of such a structure to the main carbonyl group containing species can be either through the EWD, valency permitting, or the alpha carbon between the reactive carbonyl and the EWD. The various species are depicted as follows.

| Ketone | $-C(=O)R^1$ |
| Aldehyde | $-C(=O)H$ |

Activated Aldehyde or Ketone $$-X-(EWD)-C(R^2)H-C(=O)R^2 \text{ or } (EWD)-CH-C(=O)-R^2$$

Wherein $R^1=C_1$ to $C_{10}$ alkyl, or aryl group, and $R^2=C_1$ to $C_{10}$ alkyl, or aryl group, or H.

A reactive carbonyl moiety also includes an imine or enamine form of the carbonyl. Such imine and enamine forms can be in equilibrium with the carbonyl when amines are present in solution with the carbonyl. The imine and enamine are depicted as follows.

| Imine | $-C(=NR^1)R^1$ |
| Enamine | $-C=C(NR^3R^3)R^1$ |

Wherein $R^1$ is defined as above and $R^3=C_1$ to $C_{10}$ alkyl, or aryl group or part of a ring, such as a morpholine or piperidine ring.

The reactive carbonyl moiety can also be present as a ketal or acetal, which is stable in neutral or slightly alkaline solution but reverts to the reactive ketone or aldehyde in the presence of acid. The ketal and acetal are depicted as follows

| Ketal | $-C(-OR^4)_2R^1$ |
| Aldehyde | $-C(-OR^4)_2H$ | wherein $R^1$ is defined as above and $R^4=C_1$ to $C_{10}$ alkyl, or part of a ring, such as a such as an ethylene ketal or acetal ring.

Reactive carbonyl-group(s) containing species can be an ink additive in the form of a molecular compound having a plurality of reactive carbonyl moieties (for convenience "molecular polycarbonyls").

Examples of molecular polycarbonyls include di- or poly-ketones, di- or poly-aldehydes, and aldehyde-ketones such as glyoxal, 2,5-hexanedione, glutaric dialdehyde, succinic dialdehyde, acetyl acetone, acetonyl acetone, and acetone dicarboxylic acid ester.

Other examples of molecular polycarbonyls include species prepared by trans esterification of polyhydroxy compounds with acetoacetic ester and other keto esters, such as pentaerythritol tetraacetoacetate. Polyacetoacetamides can be prepared by reaction of a low molecular weight linear, branched, or dendridic polyamine with an excess of diketene, 2,2,6-trimethyl-4H-1,3-dioxin-4-one, or by transacetoacetylation with tert-butyl acetoacetate, as described by J. Witzeman, et. al. In The Journal of Organic Chemistry, 56, 1713-18 (1991). For use in aqueous ink formulations, species containing amide and acetoacetamide linkages are preferred for resistance to hydrolysis.

Still other molecular polycarbonyls can be prepared by the Michael addition of diacetone acrylamide to linear, branched, or dendridic molecular polyamines. Molecular polycarbonyls containing aromatic ketone groups can be prepared, for example, by reaction of 4-acetyl phenyl isocyanate with molecular polyamines.

Reactive carbonyl-group(s) containing species can be an ink additive in the form of a oligomeric or polymeric compound having a plurality of reactive carbonyl moieties (for convenience "polymer polycarbonyls"). These can be soluble in the vehicle or dispersed.

Polymer polycarbonyls can be, for example, acrylic polymers containing one or more monomers with a pendant reactive ketone group. In this context the term "pendant" means a ketone group attached to the backbone or ends of a polymer or oligomer. Acrylic monomers containing ketone or aldehyde groups that can be used to prepare these polymers are illustrated in FIG. 1.

Polymer polycarbonyls can be prepared in organic solution by radical polymerization. At molecular weights of about 5000 or less the polymers would be useful as dissolved polymers in an inkjet formulation. The polymers can be solvent soluble or contain monomers which would allow them to be soluble or made soluble in aqueous media. Such monomers would include acid containing monomers or amine or quaternized amine containing monomers, hydroxylated or ethoxylated monomers. The reactive ketone or aldehyde monomers can be co-polymerized with a wide range of other acrylic or vinyl monomers to adjust polymer properties such as Tg, hydrophobicity/hydrophilicity and so forth, as desired.

The preparation of polymer polycarbonyls as homo and random co-polymers of diacetone acrylamide with styrene and acrylic monomers are described, for example, by L. E. Coleman in Journal of Polymer Science, Part A, Volume 3, Issue 4, pages 1601-1608 (1965). Homopolymers of diacetone acrylamide are also known and would be suitable.

The preparation of random, solvent soluble, acrylic polymer-polycarbonyls with acetoacetoxy functionality is described in U.S. Pat. No. 6,432,483. Random acrylic and vinyl polymer polycarbonyls prepared from acrylic and vinyl acetylacetoxy functional monomers to give water and alkali soluble polymers are described in U.S. Pat. No. 4,215,195.

Cationic co-polymers of diacetone acrylamide and diallyldimethylammonium chloride like those described in U.S. Pat. No. 6,503,977 to Kimberly Clark and in US 2003/0158324 to National Starch would also be suitable as polymer-polycarbonyls for this invention.

Figure 2A:
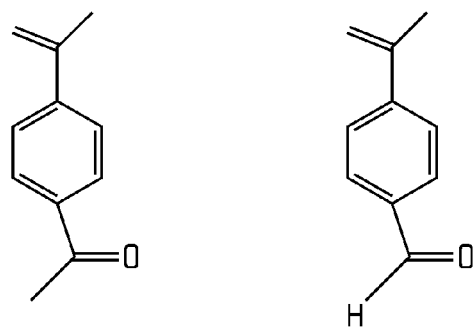
FIGS. 2a, 2b and 2c are schematic views of various alpha-methyl styrene monomers that can be used to prepare other types of polycarbonyl polymers containing reactive carbonyl groups, useful in the practice of this invention.
Figure 2B:
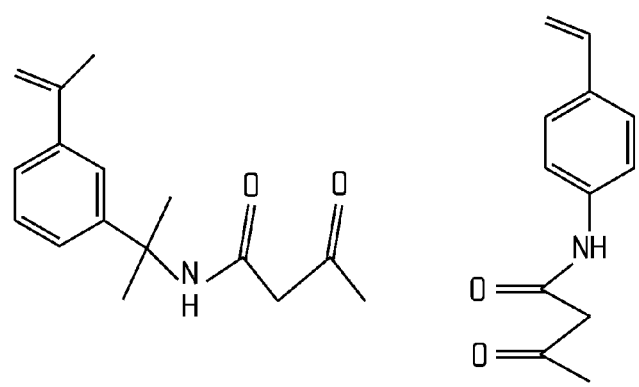
Figure 2C:
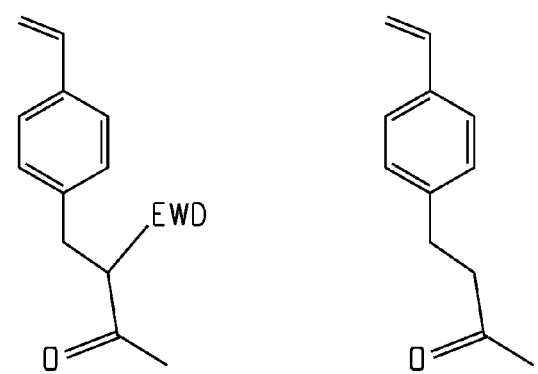

Examples of styrene and alpha-methyl styrene monomers containing reactive ketone or aldehyde groups that can be used to prepare polymer-polycarbonyl homopolymers and copolymers are illustrated in FIGS. 2a-c. The preparation and polymerization of styrene monomers containing reactive beta-diketone groups (FIG. 2b) are described in U.S. Pat. No. 5,886,116 to S. C. Johnson. Examples of styrene monomers containing reactive carbonyl groups prepared by analogy with similar monomers described in U.S. Pat. No. 6,399,273 to University of Texas are illustrated in FIG. 2c. Polycarbonyl styrene copolymers with acrylates in which either the styrene monomers or the acrylic monomers or both contain the reactive ketone or aldehyde groups would be suitable for this invention. Styrene monomers with reactive carbonyl groups can also be co-polymerized with maleic anhydride to give water soluble crosslinkable polycarbonyl polymers.

Figure 3:
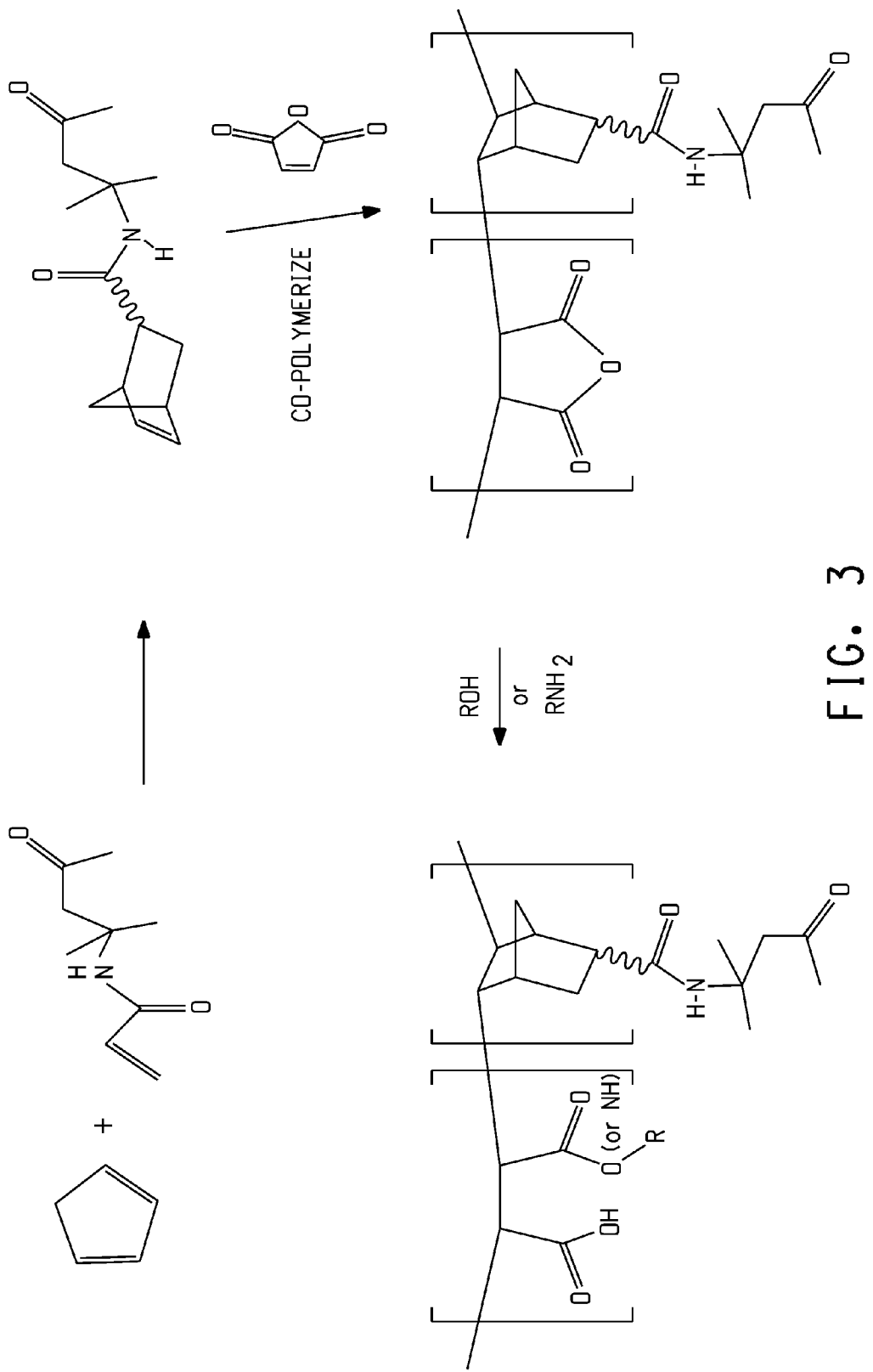

Polycarbonyl polymers can be prepared by polymerizing carbonyl containing norbornene derivatives as illustrated in FIG. 3 with maleic anhydride. The polymerization of norbornene derivatives with maleic anhydride is described by Pasquale, A. J., et. al., Macromolecular Chemistry and Physics, 2004, 205, 621-627 and Pasquale, A. J., et. al, Macromolecules, 2001, 34, 8064-8071. (see also, Houlihan, et. al., Macromolecules, 1997, 30, 6517-24.). An additional benefit of this polymer polycarbonyl is that the anhydride group can be opened with base, alcohol, or amine to give a water soluble or dispersible reactive ketone polymer. The half amide species offers the additional potential benefit for being closed to the water insoluble imide as well as being crosslinkable with suitable amine species.

Emulsion, latex, and hydrosol polymers can be important additives to aqueous ink jet inks as a dispersed phase because they enable the addition of high molecular weight polymers to the ink which can enhance print durability while allowing ink viscosity to remain within limits suitable for good jetting.

Emulsion copolymers containing reactive ketone and aldehyde groups, such as diacetone acrylamide, (meth)acrolein, formyl styrol, diacetone acrylate, acetonitrile acrylate, diacetone methacrylate, butanediol-1,4-acrylate acetyl acetate, 2-hydroxypropyl acrylate acetyl acetate, or a vinyl alkyl ketone, such as vinyl methyl ketone, vinyl ethyl ketone, and vinyl butyl ketone are described in U.S. Pat. No. 6,730,740 and such polymers can be useful as polymer-polycarbonyls. These emulsion dispersions can be partially or fully crosslinked with multifunctional hydrazides and polyamines.

Latex particles comprising diacetone acrylamide described by Haup Li, et. al., in Polymers for Advanced Technologies, 14, 212, (2003) can be useful as polymer-polycarbonyls.

Acid functional acrylic polymers containing pendant acetoacetoxy groups synthesized by one and two stage emulsion polymerization techniques as described in U.S. Pat. No. 5,609,965 to S. C. Johnson can be useful as polymer-polycarbonyls.

Latexes prepared by one and two stage emulsion techniques that contain acetylacetamide reactive ketone groups based on styrene and alpha-methylstyrene monomers (FIG. 2b) as described in U.S. Pat. No. 5,886,116 to S. C. Johnson can be useful as polymer-polycarbonyls.

Polycarbonyl latex particles containing aldehyde functions are well known in the polymer art. They are used, for example, to bind biological molecules by reaction of the aldehyde groups on the latex with amine groups in the biological molecule to form covalent linkages.

Latex particles consisting of acrolein/styrene copolymers such as those described in Polymer Latexes: Preparation, Characterization, and Applications, ACS Symposium Series 492, 1991 can be useful as polymer-polycarbonyls. Also Polystyrene core/acrolein shell latexes have been described in Microspheres: Medical and Biological Applications, CRC Press, 1988. A commercially available polystyrene core/acrolein shell particle dispersion with 100 nm particles is available from Duke Scientific Corporation in Palo Alto, Calif.

The preparation of surface reactive acetal functional waterborne microparticles suitable for this invention is described by Kjellqvis, et. al., in Journal of Applied Polymer Science, Vol 51, 1063-1070 (1994).

Pendant acetylacetonate groups on emulsion polymers are prone to aqueous hydrolysis. U.S. Pat. No. 5,525,662 describes how these groups can be stabilized in the emulsion by the addition of ammonia or a monofunctional volatile amine to convert the beta-ketone groups to enamines. On application, volatile amine evaporates, leaving the reactive ketone groups to react. However, for aqueous ink formulations, species containing amide and acetoacetamide linkages are most preferred for resistance to hydrolysis.

Hydrosols suitable for inkjet inks are described in U.S. Pat. No. 6,232,369 to DuPont. These polymers can be prepared with monomers containing reactive carbonyl moieties, such as those herein before described, and these hydrosols can be useful as polymer-polycarbonyls.

Structured acrylic and vinyl polymers (block and graft co-polymers) are important additives to inkjet ink. They can improve jetting when added to ink and they are very effective pigment dispersants. The synthesis of polycarbonyl block co-polymers of acetoacetoxyethyl methacrylate via RAFT radical polymerization is described by Krasia, T., et. al., Chemical Communications, (2003, Feb. 21), (4), 538-9. U.S. Pat. No. 6,037,390 describes the preparation of methacrylic acid macromonomers containing acetoacetoxyethyl methacrylate by using cobalt chain transfer agents to control the molecular weight, and then incorporating these macromonomers into alkali soluble polycarbonyl graft copolymers with acrylic backbones. U.S. Pat. No. 6,521,715 to DuPont describes the preparation of solvent soluble polycarbonyl graft copolymers containing pendant acetoacetoxy groups in the grafts and in the polymer backbone.

Block emulsion co-polymers containing a plurality of reactive ketone groups prepared by RAFT polymerization technology has been described in at least two publications. One publication is by Park, Y., et. al., Effect of Ambient Crosslinking on the Mechanical Properties and Film Morphology of PSty-P(Ba-co-MEMA) Reactive Composite Latexes, European Polymer Journal, 37, (2001), 965-973. A second publication is by Monteiro, M. J., et. al., Preparation of Reactive composite Latexes by Living Radical Polymerization Using the Raft Process, Macromolecular Rapid Communications, 2002, 23, 370-374.

Hydrosols containing plural reactive carbonyl groups may also be structured graft or branched copolymers. Such reactive graft polymers can be conveniently prepared by the macromonomer approach as described in Chu et al in U.S. Pat. No. 5,231,131.

Polymer polycarbonyls with may be prepared from vinyl polymers containing pendant hydroxyl groups in a post polymerization reaction by transesterification with t-butylacetylacetate, as described by Schlaad, et al., in Macromolecules, 2001, 34, 7585-7588.

Polymer polycarbonyls containing reactive aldehyde ketone groups can be prepared of reaction of already-prepared styrene maleic anhydride co-polymers. Anionic polymers containing reactive aldehyde groups (present as the alkoxyacetal) suitable for this invention are described in U.S. Pat. No. 5,298,567 to Air Products. The polymers are prepared by reacting 4,4-dimethoxybutylamine with styrene maleic anhydride (SMA) copolymers to form an acid amide group. Another amine functional ketone that can be reacted with SMA polymers to yield reactive polymers is, for example, 5-amino-2-pentanone or p-aminoacetaldehyde. SMA polymers are available in a range of different styrene to maleic anhydride ratios. Maleic anhydride copolymers with other olefinic monomers are commercially available which would also yield useful reactive ketone polymers. SMA resins are also well known as dispersants for pigments and those resins made with reactive carbonyl groups can be used to prepare reactive pigment dispersions.

Figure 4A:
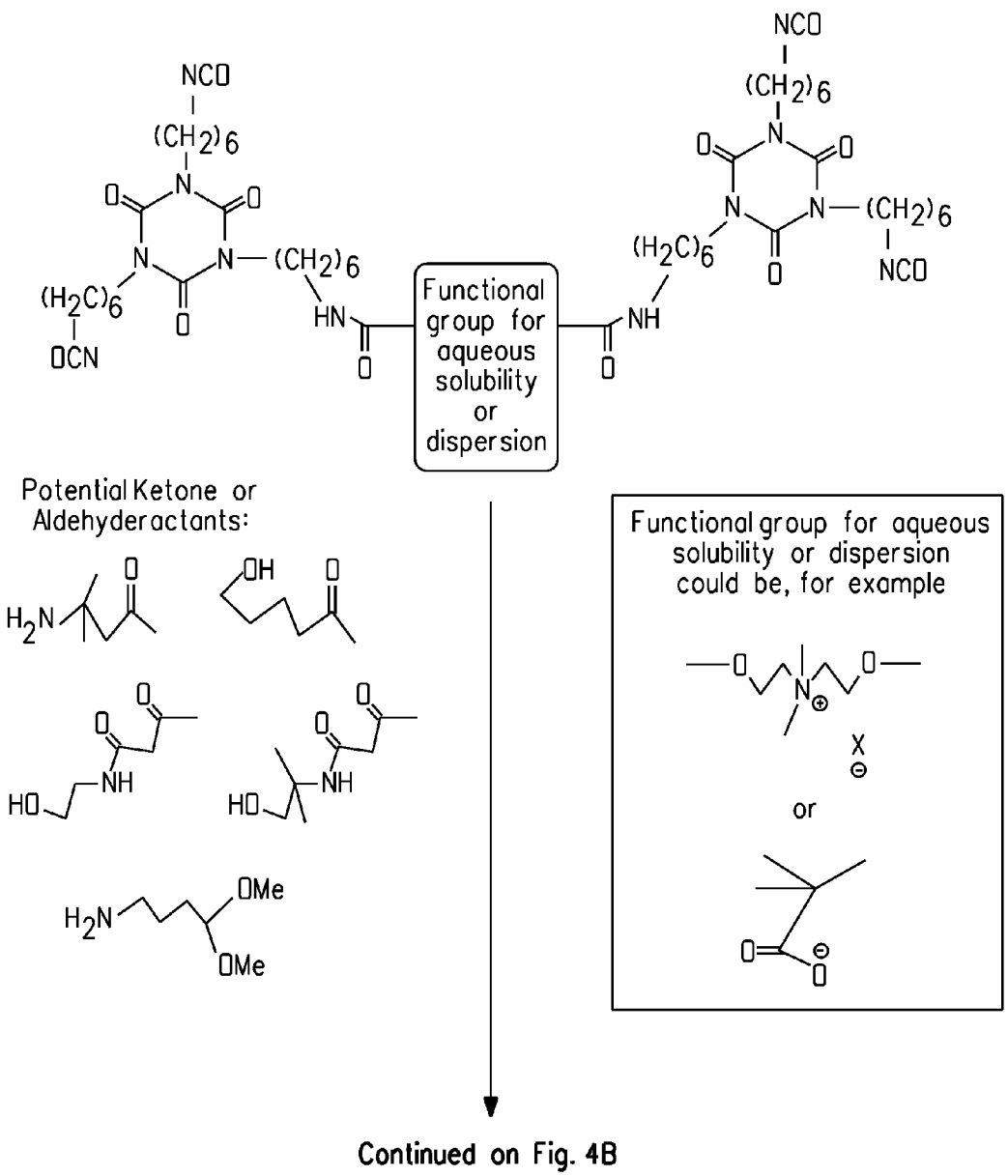
Figure 4B:
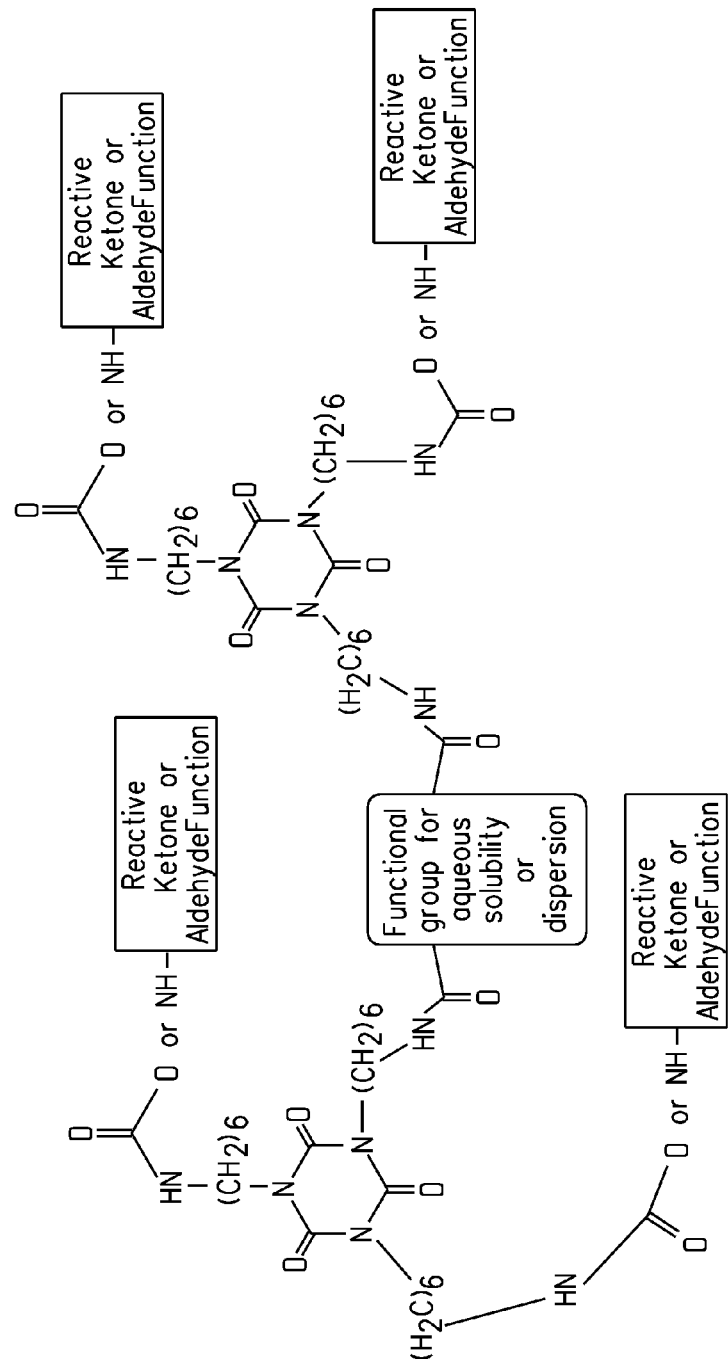

Polymer polycarbonyls can also be, for example, polyurethane dispersions with reactive ketone groups such as those described in U.S. Pat. No. 5,147,926 to BASF, US 2002/0040093 to Akzo Nobel, and U.S. Pat. No. 5,552,496 to Herberts. Examples of polymers useful in the present invention containing "terminal" reactive ketone groups are illustrated in FIGS. 4a-b. Those aqueous species containing beta carbonyls linked via an amide bond would be preferred over an ester bond because of greater hydrolytic stability. Polymeric or oligomeric "terminal" groups can be prepared with hydroxy or amine terminated polycarbonyl acrylic, vinyl, or oxazoline polymers or oligomers.

Figure 5F:
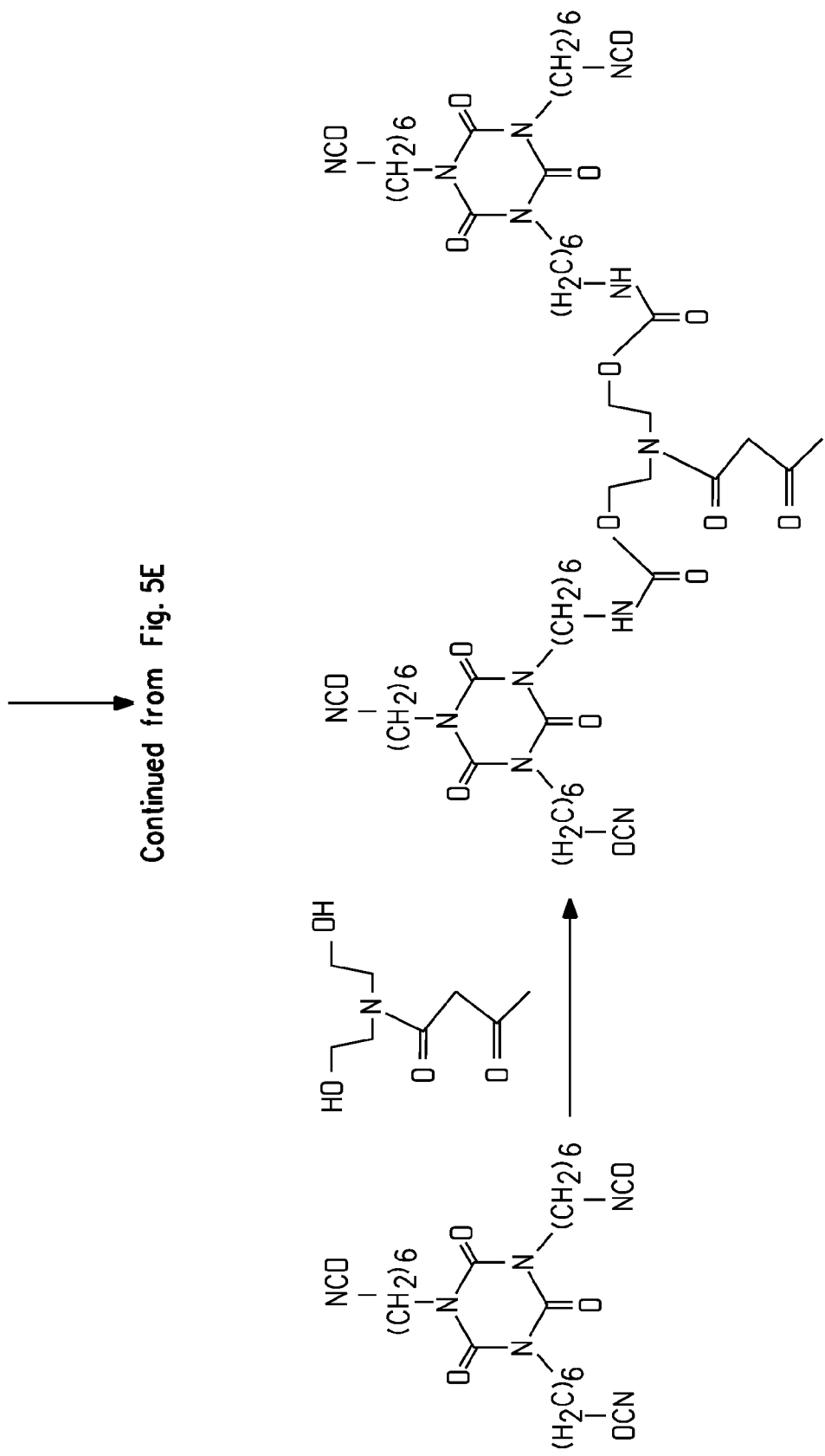

The reactive ketone functionality can also be incorporated into the polyurethane as a diol or diamine "linker" between two isocyanate groups, as illustrated in FIGS. 5a-f. Diol in FIG. 5a. is described in WO 971113 to BASF. Diol in FIG. 5b is described in U.S. Pat. No. 4,983,662 to ICI Resins. Dihydroxy acetone (in FIG. 5d) or glyceraldehyde (in FIG. 5e) can also be used. In principle, the Michael addition of diethanol amine or a diamine such as isophorone diamine to any of the alpha-beta unsaturated monomers illustrated in FIG. 1 can be used to create a "linker" reactive carbonyl group like 6c, as described in U.S. Pat. No. 4,598,121 to Chemishe Werke Huls AG. Another "linker" containing reactive carbonyl groups can be telechelic acrylic, vinyl, or oxazoline polymers with two or more hydroxy or amine groups.

Aqueous polyurethanes are often chain extended upon inversion into the aqueous dispersion with di and triamines, hydrazines, etc. Polymer polycarbonyls can be formed during chain extension, as suggested in U.S. Pat. No. 4,983,662 to ICI Resins, with the diamino compound in FIG. 5c.

Aqueous polycarbonyl acrylic/polyurethane hybrid emulsions containing reactive ketone and aldehyde functionality are also suitable polymer additives for this invention. Suitable species are described in M. Hirose, Progress in Organic Coatings, 31, (1997) 157-169 Core-Shell acrylic polyurethane hybrids containing diacetone acrylamide as the reactive ketone are described by Dong, A. et. al, in Macrol. Chem. Phys., 199, 2635-2640 (1998).

Acid or quaternary amine functionality can be incorporated into these polyurethanes if needed for water dispersability by reacting an amine or hydroxy functional acid at one of the terminal isocyanate groups, or a diamine or dihydroxy acid or quat as a linker, or by using a chain extender with acid functionality such as 2,6-diaminohexanoic acid upon inversion of the polyurethane into water.

Figure 6A:
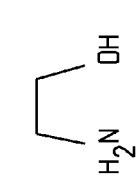
Figure 6A:
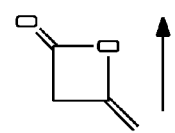
Figure 6A:
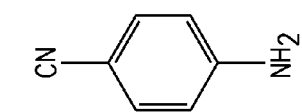
Figure 6A:
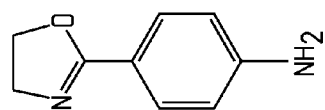
Figure 6A:
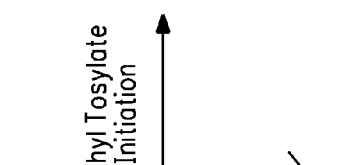
Figure 6A:
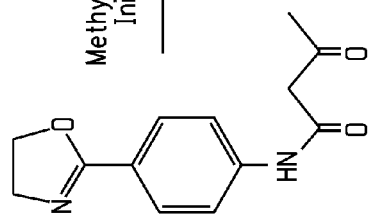
Figure 6A:
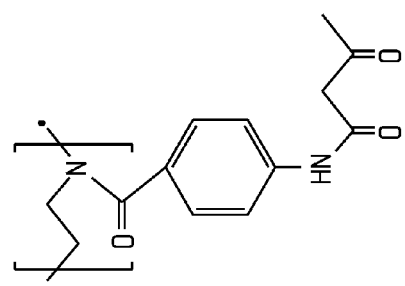
Figure 6C:
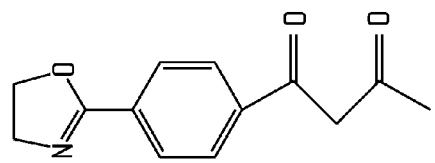
Figure 6B:
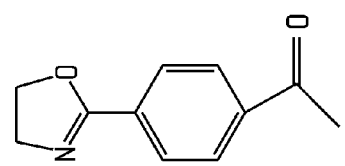

Polymer polycarbonyls can be polyoxazoline polymers containing reactive ketone groups prepared from the monomer as illustrated in FIG. 6a and described in U.S. Pat. No. 6,235,901 to S. C. Johnson. Other potential monomers reactive ketone oxazoline monomers not described in U.S. Pat. No. 6,235,901, are illustrated in FIGS. 6b-c. The preparation of monomer in FIG. 6b is described by Badiang, J., et. al., in J. Org. Chem., 61, 2484-2487.

Polymer (or resinous) polycarbonyls can be water soluble or dispersible cellulose acetoacetates that are crosslinkable with polyamines. Their synthesis and properties are described by K. J. Edgar in Macromolecules, 1995, 28, 4122-4128.

Figure 7:
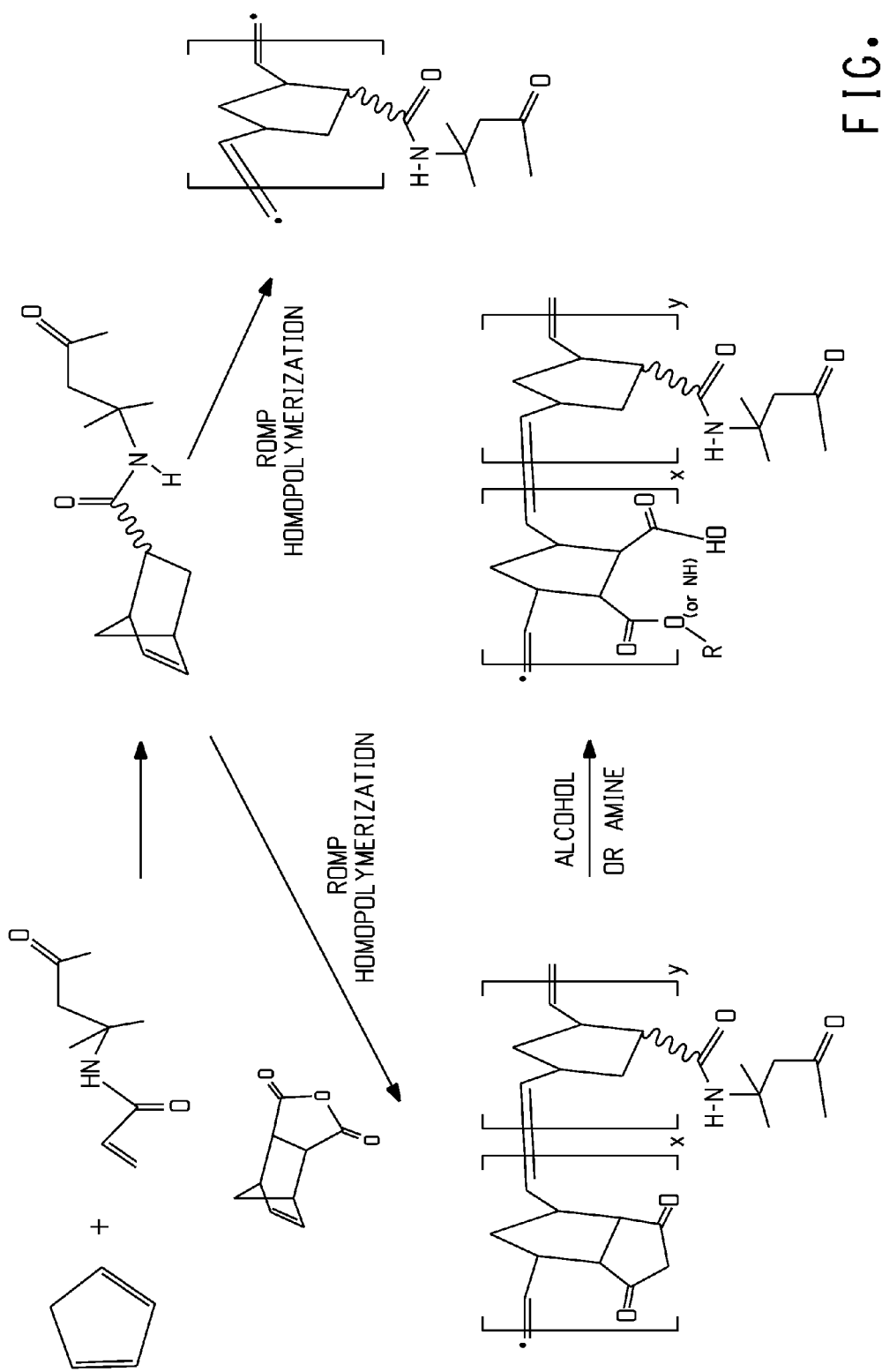

Polymer polycarbonyls can be prepared by ring opening metathesis polymerization (ROMP). Examples of a ROMP homopolymer and a ROMP co-polymer containing reactive ketone groups are illustrated in FIG. 7. The co-polymer containing the anhydride monomer can be opened with base, alcohol, or amine after polymerization to give a water soluble or dispersible polymer. The half amide species offers the additional benefit of the potential for being closed to the water insoluble imide by heating of the printed layer as well as being crosslinking with a suitable reactive amine species.

It will be readily appreciated by the skilled artesian that the various molecular and polymer additives containing reactive carbonyl species, herein before mentioned, can be adapted for use as dispersants for a pigment particle ("reactive carbonyl containing dispersants"). Dispersants are distinguished from additives in that they surround, physically adsorb to and/or encapsulate a particle surface and provide good dispersibility to an otherwise poorly dispersible particle. Processes for preparing a pigment dispersions are in general well know in the art.

Pigment dispersions with reactive carbonyl containing dispersants, can serve wholly, or in part, as the required reactive carbonyl containing species in an ink.

An example of reactive carbonyl (beta-diketone) containing dispersant and dispersion is provided in U.S. Pat. No. 6,037,390 to DuPont. The beta-diketone containing polymeric dispersants comprise 2-50% by weight of beta-diketone monomers. Some suitable beta-diketone monomers include acetoacetoxy ethyl methacrylate, 2-(acetoacetoxy) ethyl acrylate, methacrylamido-ethylacetoxy acetate, hexadione methacrylate, 2-(acetoacetoxy)propyl methacrylate. Preferred beta-diketone monomers for aqueous compositions would be those which are resistant to aqueous hydrolysis, such as N-(3-acetoacetamidopropyl)methacrylamide, N-(3-acetoacetamidopropyl)methacrylate, N-(2-acetoacetamidoethyl) (meth)acrylamide, N-(2-acetoacetamidoethyl) (meth) acrylate, and, 4-acetoacetyl-1-methacryloylpiperazine.

U.S. Pat. No. 6,136,890 describes the preparation of polyurethane dispersants and aqueous pigment dispersions made therefrom which are suitable for inkjet use. Reactive ketone groups can be incorporated into these polyurethane in ways previously described that would allow the preparation of reactive pigment dispersions.

Styrene acrylic and styrene maleic anhydride polycarbonyl polymers, such as those herein before described as additives can be used as pigment dispersants.

Polyoxazoline block copolymers which are useful aqueous dispersants are described in U.S. Pat. No. 5,858,331 to DuPont. These dispersants can contain these reactive ketone monomers.

A newer process for preparing pigment dispersions is carried out by polymerizing monomers around a pre-dispersed pigment to encapsulate in it polymer. The encapsulation process can be achieved in several ways. Following are examples of how reactive carbonyl monomers can be incorporated into these encapsulation processes to make polycarbonyl-encapsulated dispersible pigments.

One method of pigment encapsulation is by mini-emulsion polymerization. The preparation of a stable encapsulated carbon black by mini-emulsion polymerization with styrene and acrylate monomers in the 100-200 nm particle size range has been described by K. Landfester in Macrol. Chem. Phys. 2001, 202, 51-51 and in Macromol. Symp. 151, 549-555, (2000). The process allows the preparation of encapsulated dispersions with pigment to polymer ratios of approximately 4 to 1 to 1 to 9. Polycarbonyl polymer encapsulated pigments can be prepared by substituting some or all of the styrene with the acrylic carbonyl and styrene carbonyl monomers shown in FIGS. 1 and 2. Polycarbonyl polyurethane pigment dispersions comprising a pigment encapsulated by polycarbonyl polyurethane polymer would also be possible, because the miniemulsion process can also be used to prepare addition polymers.

Another method of pigment encapsulation (for preparing "enclosed" pigments) is described in U.S. Pat. No. 6,538,047 and U.S. Pat. No. 6,864,302 to Epson. A pigment, dispersed with a polymerizable surfactant, is mixed with a pre-emulsified mixture of acrylic monomers and initiator; sonicated, and polymerized. The prepared dispersions can be anionic or cationic and have particle sizes of 200 nm or less. In a variation on this process, described in US 2004/0229974 to Epson, pigment particles with carboxylate or sulfonate groups covalently attached, are treated with a quaternary monomer such as dimethylaminoethylmethacrylate methylchloride. These pigments were then emulsion polymerized with an anionic polymerizable surfactant and a mixture of acrylic monomers to yield encapsulated pigments. Polycarbonyl polymer encapsulated pigment dispersions can easily be prepared by these processes by incorporating vinyl or acrylic monomers with reactive carbonyls in the monomer mixes.

The preparation of colored fine resin particles is described in US2003/0050362 to Canon. Pigments coated with water insoluble resins are dispersed by encapsulated them with a polymerized mixture of vinyl or acrylic monomers and reactive emulsifier. Again, these monomers can contain reactive carbonyl monomers to make these into polycarbonyl dispersions.

Reactive carbonyl-groups containing species can be inorganic particles with reactive carbonyl-groups chemically attached to the surface. The particles can be clear and serve as a crosslinking agent without changing hue of ink. In addition to crosslinking, the presence of the inorganic particles themselves can enhance toughness and scratch resistance of a coating. These properties are most effective when the particle is covalently bound into the coating matrix.

Inorganic particle can be, for example, silica, alumina, titania, zirconia, indium tin oxide and others. These particle can be nanoparticles such as nano $SiO_2$ and nano $TiO_2$.

Figure 8:
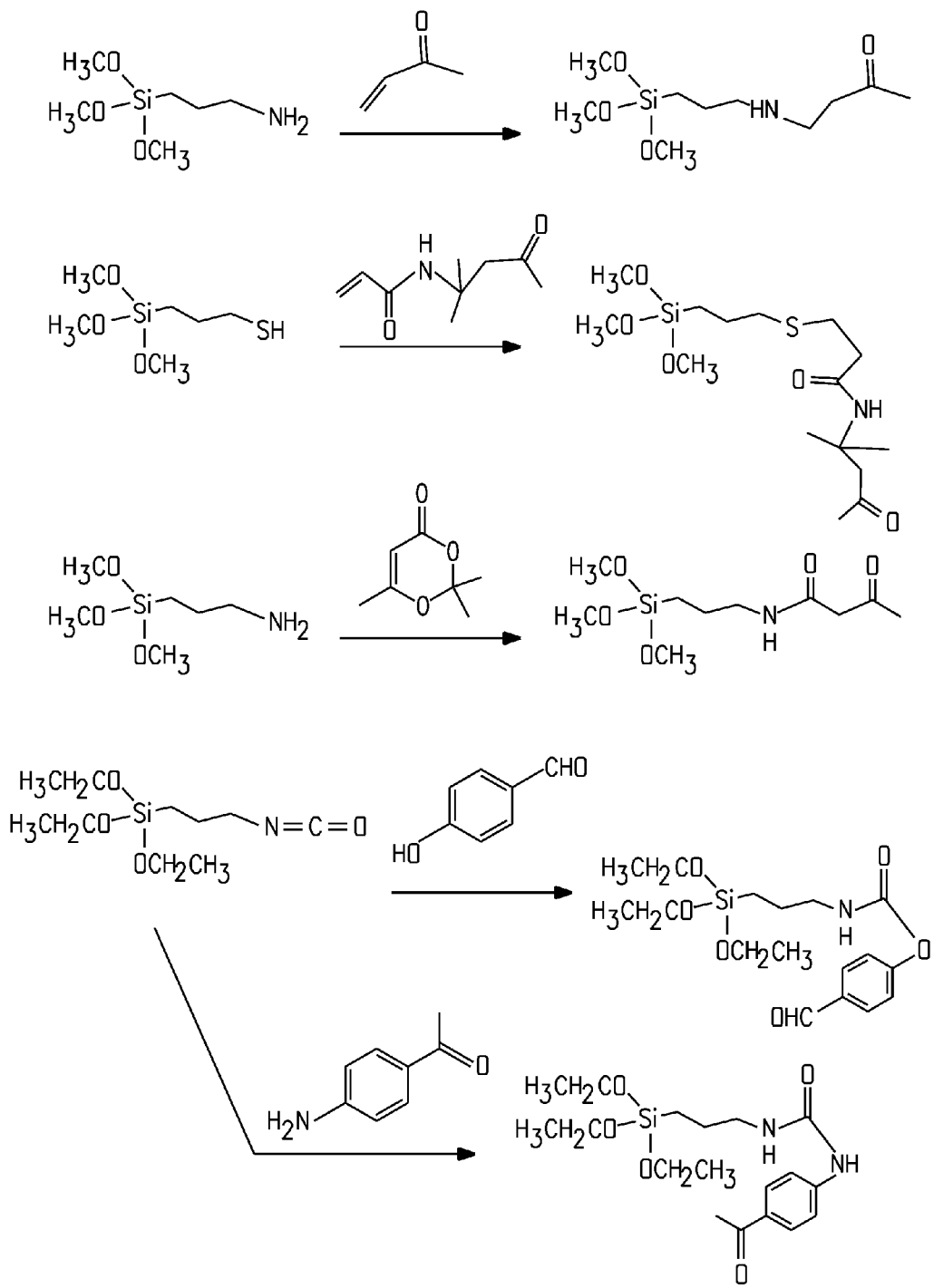
FIGS. 8 and 9 illustrate various synthetic routes for the preparation of siloxanes with reactive carbonyl groups that can be used to form carbonyl functionalized inorganic oxide particles that can be used as the reactive carbonyl containing species in this invention.
Figure 9:
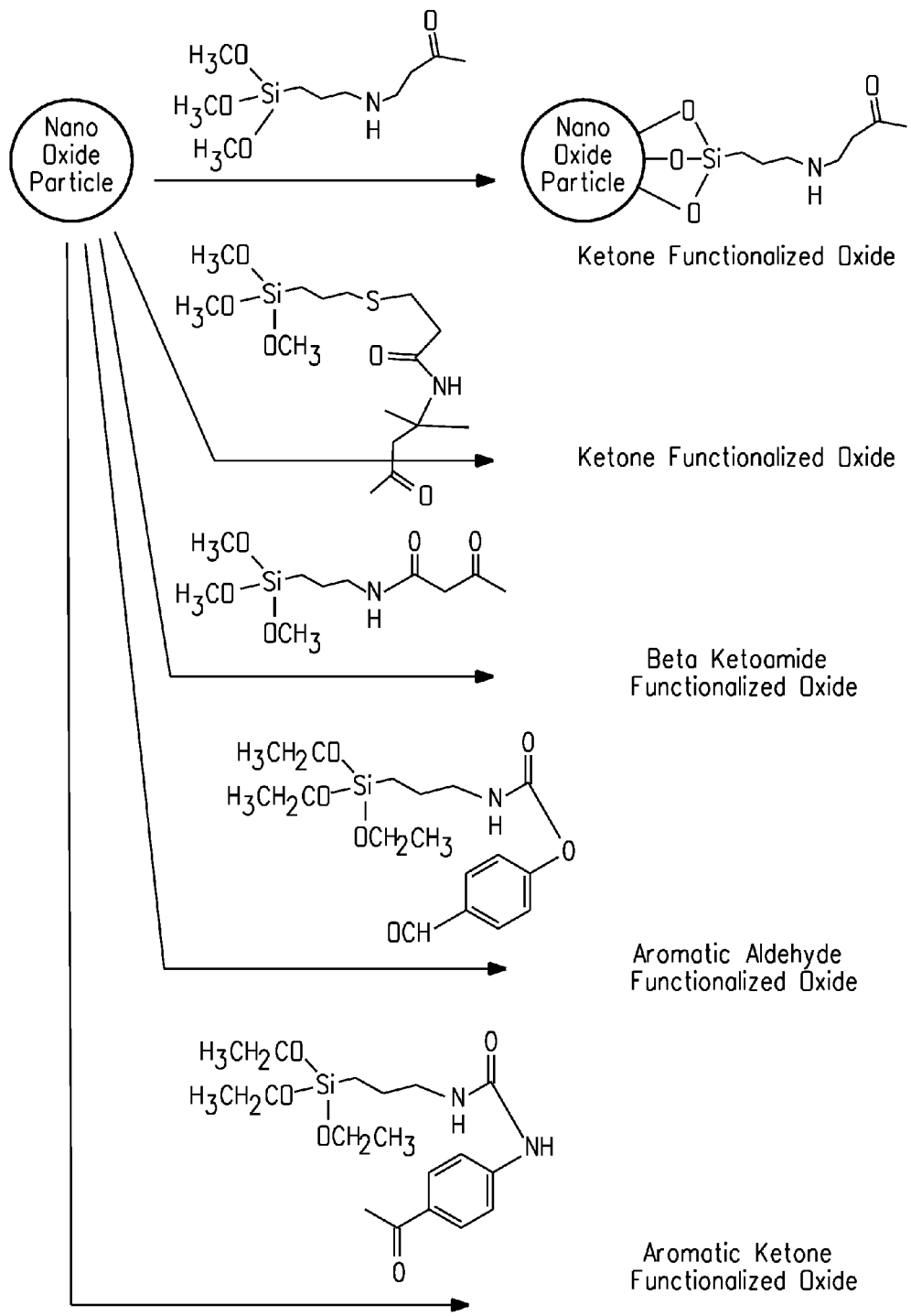

The surface of inorganic oxide particles typically contains hydroxyl groups that can be functionalized with siloxane reagents containing reactive ketone groups. FIG. 8 illustrates potential synthetic routes for preparation of siloxanes with reactive carbonyl groups. Examples of inorganic oxide particles useful in this invention with reactive carbonyls made from these siloxanes are illustrated in FIG. 9. These particles would be stabilized in an ink solution by means of polymer dispersants as described earlier, or by means of adsorbed ions or covalently bound groups (e.g., by means of siloxane bonds) such as carboxylates, quaternary amines, or polyethylene oxides for aqueous inks or groups that would stabilize the particles in a solvent based ink. The examples illustrated are representative of the concept and in no way limit the invention.

Reactive carbonyl species can be organic groups chemically attached (grafted) to the surface of an organic pigment particle. Techniques for surface modification of pigments are well known and such techniques can be adapted for use herein.

Reactive Amine-Groups Containing Species

These species preferably contain two or more reactive amines. Reactive amines include primary and secondary amines, hydrazine, hydrazide, hydrazone, or semicarbazide groups on the reactive species in the second ink include those depicted below.

hydrazine, R—NH—$NH_2$
hydrazide, R—C(=O)NH—$NH_2$
hydrazone, RR'C=N—$NH_2$
semicarbazide, R—NH—C(=O)—NH—$NH_2$
carbazide (or carbohydrazide), R"NH—NH—C(=O)—NH—$NH_2$ wherein R, R' represent, independently, alkyl or aryl linkage to multifunctional reactive amine species and R" represents H, or alkyl or aryl linkage to multifunctional reactive amine species, The reaction of an amine species to a carbonyl can be acid catalyzed, so the reactive amine species may be present as an fully or partially protonated salt of an acid such as hydrochloric acid, nitric acid, sulfuric acid, phosphoric acid, acetic acid, toluene sulfonic acid, etc.

Reactive amine-groups containing species can be low molecular weight polyamine additives, especially those with primary and/or secondary amino groups, most preferably primary amines, and from 2 to 10 such reactive amine groups per molecule. These include, for example, ethylenediamine, propylenediamine, decamethylene diamine, 1,2-diaminocyclohexane, isophoronediamine, 4-amino-1,8-octanediamine urea, N-(2-hydroxyethyl)ethylenediamine, tris(2-aminoethyl)amine, melamine, diethylenetriamine, dipropylenetriamine, dibutylenetriamine, polyethylene imines, and Jeffamine®, (polyoxyethylene amines available from Huntsman Corporation, Houston, Tex.). Polyethylenimines typically contain a mixture of primary, secondary, and tertiary amines (depending on the level of branching) and are commercially available from many sources including POLYMIN poly(ethylenimine) and LUPRASOL® poly(ethylenamine) available from BASF.

Primary amine-groups containing species can be present in blocked form for use in a solvent based ink as easily hydrolyzable ketimines made with volatile ketones such as acetone, methylethylketone, or methylisobutylketone. The hydrolytic conversion of the blocked amine groups to free amines would depend on interaction with an aqueous polycarbonyl ink or atmospheric moisture if the polycarbonyl ink is also a solvent ink.

Other reactive amine-groups containing species suitable for this invention, prepared by the reaction of ketimine blocked diethylene triamine with epoxy resins or Michael addition with multifunctional acrylate species, are described in U.S. Pat. No. 6,605,688 to DuPont.

Reactive amine-groups containing species can be polymer additives such as polyvinyl amine, polyallyl amine, polyurethane amines, polyacrylic (primary or secondary) amines. The polymers can be soluble or dispersed in the ink vehicle.

Polyacrylic amines include, for example, acrylic polymers where the carboxylic acid groups are reacted with ethylenimine or propylenimine to form pendant amine groups, as described in U.S. Pat. No. 6,441,102 (Nippon Shokubai) and U.S. Pat. No. 4,529,765 (DuPont).

Polyurethane amines suitable for this invention include amine terminated urethane resins as described in U.S. Pat. No. 6,218,500 and U.S. Pat. No. 4,772,643 to the Tennant Corporation.

Polymers also include polystyrene latexes with surface amine groups such as those described by Ganachaud, et al., in Journal of Applied Polymer Science, Vol. 65, 2315-2342.

Figure 10A:
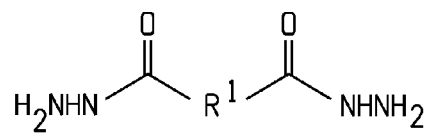
FIGS. 10a-c and 11a-b show examples of suitable compounds with coreactive amine groups, useful in the practice of this invention.

Examples of such suitable polyhydrazine compounds include dicarboxylic acid bishydrazides in FIG. 10a, wherein $R^1$ is a covalent bond or a polyalkylene (preferably polymethylene) or alicyclic group having from 1 to 34 carbon atoms or a divalent aromatic ring. Examples of suitable dihydrazides include oxalic acid dihydrazide, malonic acid dihydrazide, succinic acid dihydrazide, glutaric acid dihydrazide, adipic acid dihydrazide cyclohexane dicarboxylic acid bis-hydrazide, azelaic acid bis-hydrazide, sebacic acid dihydrazide and tartaric acid dihydrazide.

Figure 10B:
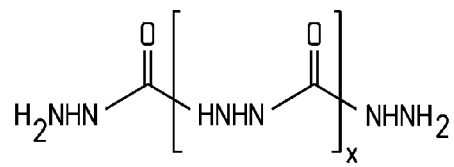
Figure 10C:
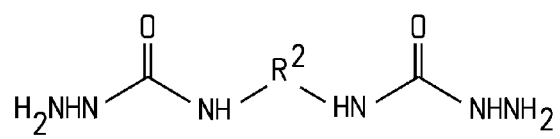

Other suitable compounds are polyhydrazides of carbonic acid, e.g. carbonic acid dihydrazide and compounds in FIG. 10b where x is from 1 to 5, preferably from 1 to 3, and bis-semicarbazides, especially aliphatic and cycloaliphatic bis-semicarbazides in FIG. 10c, where —$R^2$— is a straight or branched aliphatic radical of 2 to 7 carbon atoms or a carbocyclic radical of 6 to 8 carbon atoms, e.g. o-, m- or p-phenylene or toluene or cyclohexylidene or methylcyclohexylidene.

Polyhydrazides of aromatic polycarboxylic acids include the dihydrazides of phthalic acid, terephthalic acid and isophthalic acid, and the di-tri- and tetra-hydrazide of pyromellitic acid. Polyhydrazides also include nitrilotriacetic acid trihydrazide and ethylenediaminetetraacetic acid tetrahydrazide. Other possible hydrazides include dihydrazino- and trihydrazino-triazine, thiocarbohydrazide and N,N'-diaminoguanidine; hydrazinopyridine derivatives of the type of 2-hydrazino-pyridine-5-carboxylic acid hydrazide, 3-chloro-2-hydrazinopyridine-5-carboxylic acid hydrazide, 6-chloro-2-hydrazinopyridine-4-carboxylic acid hydrazide and 2,5-dihydrazinopyridine-4-carboxylic acid; and, bis-thiosemicarbazides as well as bis-hydrazines of alkylene-bis-acrylamides, dihydrazinoalkanes and dihydrazines of aromatic hydrocarbons such as 1,4-dihydrazinobenzene, 1,3-dihydrazinobenzene and 2,3-dihydrazinonaphthalene.

The preparation of multifunctional hydrazides useful for this invention is described by Vercruysse, K. P., et. al., in Bioconjugate Chem., 1997, 8, 686-694.

Poly(meth)acrylic hydrazides suitable for this invention can be prepared by treatment of acrylic esters homo or co-polymers with hydrazine hydrate as described in Jones, A. S. et. al., Tetrahedron, Vol 32, 2361-2364 (1976) and U.S. Pat. No. 4,694,383 to British Petroleum. Such hydrazide polymers can be present in the ink as soluble species, hydrosols, a dispersion, or a latex.

Polyurethanes with pendant hydrazide functionality suitable for this invention can be prepared by several methods. They can be prepared in solvent and used in solvent based inks, or they can be prepared with functional groups such as carboxyl or quaternary ammonium groups that allow them to be soluble or dispersible in water for use in aqueous based ink.

Terminal hydrazine groups can be added to a polyisocyanate precursor polymer by the addition of a molar equivalent or more of hydrazine, dihydrazide, or disemicarbazide as described in U.S. Pat. No. 5,700,867 to Toyo Ink.

Figure 11A:
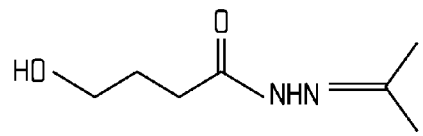
Figure 11B:
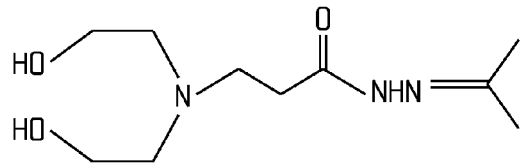

It may be desirable to incorporate the hydrazine functionality into the polyurethane in a fashion that will not allow the initial adduct to react with the isocyanate groups. Such methods are described in U.S. Pat. No. 4,983,622. An example would be gamma hydroxy butyric hydrazide blocked with a low molecular weight ketone, such as species in FIG. 11a, which can be reacted with the isocyanate group through its hydroxy group. Another example would be a diol formed by reacting diethanol amine with ethyl acrylate, followed by reacting with hydrazine and blocking it with acetone, as illustrated in species in FIG. 11b. The molecule in FIG. 11b would allow the blocked hydrazine to act as a linker within the polyurethane molecule. These protected hydrazines are claimed to be stable enough to allow the polyurethane to be chain extended upon inversion into water at conditions where the pH is at 8 or greater. The hydrazine groups can be deblocked at a later step by lowering the pH or upon evaporation of the amine neutralizing agent as a coating of the polyurethane is drying.

Chain extension of aqueous polyurethanes with diamine compounds which contain hydrazine groups can be achieved as described in U.S. Pat. No. 4,598,121. According to U.S. Pat. No. 4,598,121, the primary and secondary amine groups react with isocyanate groups react faster than the hydrazide group, allowing the latter to remain as a reactive group.

Figure 12:
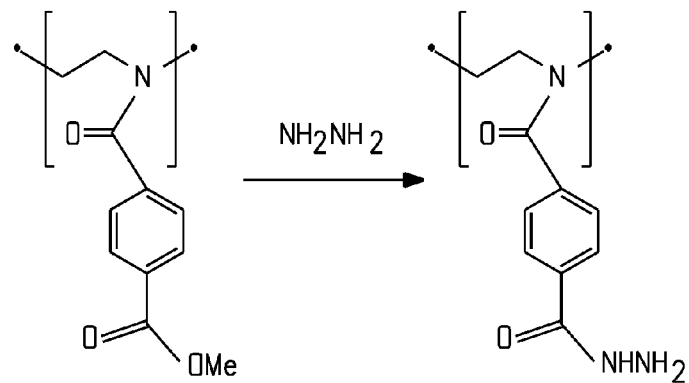
FIG. 12 shows a synthetic route to a polymer containing pendant amine group(s) useful in this invention.

An example of a polyoxazoline polymer with pendant hydrazine groups that can also be useful in this invention is illustrated FIG. 12. It would be prepared by displacement of the methoxy group of methyl esters in the polymer by hydrazine, much like the preparation of acrylic hydrazides.

A reactive amine-groups containing species can be in the form of a dispersant. For example, block copolymer dispersants which contain pendant primary amine groups and the aqueous pigment dispersions made from them would be suitable for this invention and are described in U.S. Pat. No. 6,306,994 to DuPont. Such dispersants and dispersions can be used on carbon black, organic, or inorganic pigments. Useful dispersants and also be prepared from acrylic hydrazide polymers such as, the acrylic hydrazide provided as an in the examples hereinafter.

Reactive amine-groups containing species can be transparent surface treated inorganic particle additives such as surface treated oxides of silicon, titanium, zirconium, and indium tin oxide. The inorganic particles can be nanoparticles.

Figure 13:
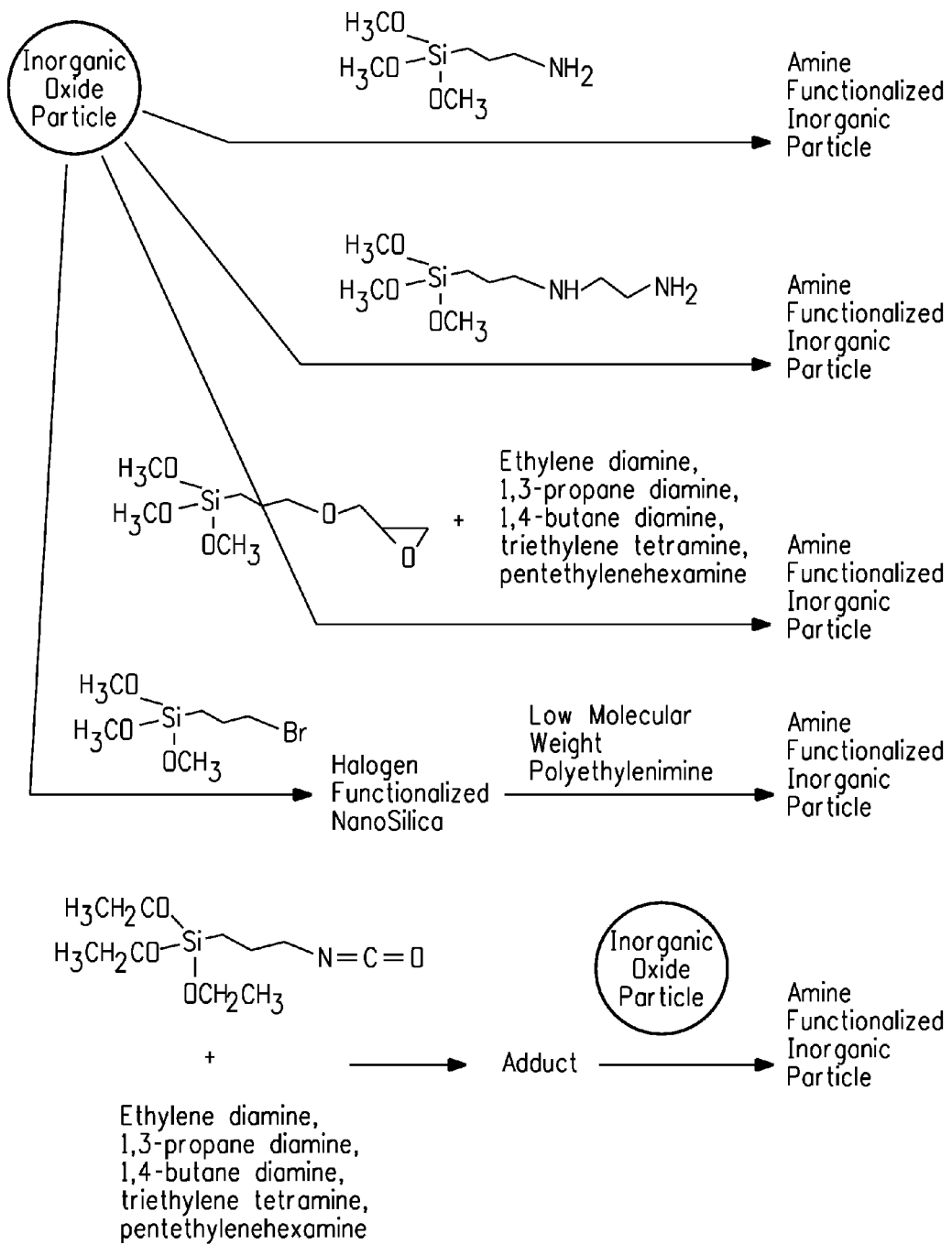
FIG. 13 illustrates synthetic routes to amine functionalized inorganic oxide particles that can be useful in the practice of this invention.

The surface of these oxide particles can be reacted with amino functional propyl trialkyl siloxanes to make them contain covalently bound amino groups as illustrated in FIG. 13.

Various multifunctional amines such as ethylene diamine, 1,3-diaminopropane, 1,4-diaminobutane, triethylentetraamine, or pentaethylenhexamine can be reacted with glycidoxypropyltrimethoxysilane, and the product of that reaction reacted with oxide nanoparticles. Examples of amine functional silica nanoparticles useful for this invention are described by Csogor, et. el., in Materials Science and Engineering C., 23, (2003) 93-97. The nanosilica can also be functionalized with a halopropyltrialkylsilane or with glycidoxypropyltrimethoxysilane and then reacted with a low molecular weight polyethylenimine, or the nanosilica can be reacted directly with a low molecular weight polyethylenimine that has been pre-reacted with a halopropyltrialkylsilane, such as N-[3-(trimethoxysilyl)propyl]polyethylenimine hydrochloride, sold by Aldrich Chemical. The amine siloxane reagents can be converted into semicarbazide group siloxane reagents or carbazide group siloxane reagents prior to linking with the inorganic oxide particles. The resulting semicarbazide functional and hydrazide functional inorganic particles would be suited to formulate into the second ink to act as crosslinking agents for components of the first ink which contain reactive ketones or aldehydes. The inorganic particles can also be reacted directly with a hydrazinopropyl siloxane reagent.

Reactive amine-groups containing species can be organic groups chemically attached (grafted) to the surface of an organic pigment particle. Techniques for surface modification of pigments are well known and such techniques can be adapted for use herein.

Ink Sets

The term "ink set" refers to all the individual inks or other fluids an inkjet printer is equipped to jet. An ink set according to the present invention comprises at least two inks, one of the at least two inks comprises a vehicle and a reactive carbonyl-group(s) containing species and the other of the at least two inks comprises a vehicle and a reactive amine-groups containing species. Either one or both of the at least two inks can comprises colorant.

Generally, an inkjet ink set will comprise at least three colored inks (for example cyan, magenta and yellow), and typically at least four inks (for example cyan, magenta, yellow and black). In a preferred embodiment, an ink set would contain a plurality of colored inks and all the colored inks in the set would contain a similar reactive species, in other words, all colored inks would contain a reactive carbonyl-group(s) containing species or all colored inks would contain a reactive amine-groups containing species. Furthermore, in a preferred ink set, there would be present at least one substantially colorless ink. The at least one colorless ink comprises a reactive carbonyl-group(s) containing species or a reactive amine-groups containing species such that when the colored inks in the set all contain a reactive carbonyl-group(s) containing species, the colorless ink contains a reactive amine-groups containing, and, when the colored inks in the set all contain a reactive amine-groups containing species, the colorless ink contains a reactive carbonyl-group(s) containing species.

In the current context, substantially colorless means without perceptible color to the naked eye. Also, a colorless ink can be applied to a substrate in an overlapping relationship with a colored ink without substantially changing the hue of the colored ink.

It will be appreciated that an ink set can comprise any number of colored and colorless inks given the teaching provided herein. In addition to the typical CMYK inks, the ink sets in accordance with the present invention may further comprise one or more "gamut-expanding" inks, including different colored inks such as an orange ink, a green ink, a red ink and/or a blue ink, and combinations of full strength and light strengths inks such as light cyan and light magenta.

Substrate

The substrate can be any suitable substrate including plain paper, such as common electrophotographic copier paper; treated paper, such as photo-quality inkjet paper; textile; and, non-porous substrates including polymeric films such as polyvinyl choride and polyester.

Printing Method

The inventive ink set of may be jetting with any suitable inkjet printer, including the numerous commercial printers presently available.

The advantages of the instant ink set can be best realized when an ink containing a reactive carbonyl-group(s) containing species is printed onto a substrate an overlapping relationship with an ink containing a reactive amine-groups containing species. In this way, both types of reactive species are present in proximity on the substrate and crosslinking can occur. Printing of the inks can occur in any order or simultaneously.

In addition to drying of the inks on the printed substrate at room temperature, it may be advantageous to heat the printed substrate to accelerate the crosslinking reaction of a reactive carbonyl-group(s) containing species with a reactive amine groups containing species. Useful temperatures for this purpose are typically from about 60° C. to about 150° C.

The following example illustrates the invention.

EXAMPLE

Preparation of Acrylic Polyhydrazide

Sixty two and a half grams of ethyl acrylate, 0.675 grams of VASO 64 (2,2'-azobis[2-methyl-Propanenitrile]), and 12.5 grams of dodecylmercaptan were dissolved in 175 grams of ethyl acetate and the mixture heated to 67° C. for 24 hours. The solvent was removed by rotovap to yield 65 grams of a polymer determined to have an Mn (number average molecular weight) of 390 and an Mw (weight average molecular weight) of 2100 by size exclusion chromatography in THF (teterahydrofuran). Fifty grams of this polymer was dissolved in 250 ml. of ethanol, and 50 grams of hydrazine hydrate was added with stirring. After refluxing the solution overnight at 85° C., an acrylic polyhydrazide polymer was formed as white precipitate on the sides and bottom of the flask. The solvent and water were removed on the rotovap and the acrylic polyhydrazide polymer was dried under high vacuum and recovered.

Preparation of Black Dispersion

In 80 grams of deionized water, 3.2 grams of the dry hydrazide polymer prepared above were dissolved along with 2.24 grams of glacial acetic acid. This solution was poured into a heavy walled screw cap bottle along with 8 grams of Nipex 180 IQ black pigment, 60 grams of sand, and 0.4 grams of NOPCO defoamer. This was shaken for 3 hours on a Red Devil paint shaker to give a deflocculated low viscosity black dispersion which was then filtered through 5 micron paper. The resulting dispersion had 4.6% solids and a particle size of 218 nm.

To a separate, small sample of the black dispersion, a few drops of 40% glyoxal solution were added to evaluate it as a potential reactive polycarbonyl. The combination of the glyoxal and dispersion resulted in the immediate formation of a black precipitate suggesting that glyoxal would be useful as a polycarbonyl.

Preparation of Ink A

A black ink with reactive amine (hydrazide) was prepared by mixing together 43.5 grams of the black dispersion prepared above, 4.5 grams of glycerol, 3 grams of ethylene glycol, and 0.5 grams of BYK 348 surfactant. The mixture was centrifuged to separate oversized particles, and the supernatant was recovered to give Ink A with an average particle size of 145 nm.

Preparation of Ink B

Ink B was a reactive polycarbonyl ink containing a mixture of 10% glyoxal, 95% glycerol, 6% ethylene glycol, 5% 1,2-hexane diol, and 0.05% Byk® 348. Percentages are weight percent of the total weight of ink.

Example 1

Inks A and B were loaded into an Epson 3000 printer and a pattern of four 0.5 inch wide horizontal bars were printed on Boise Cascade x-9 paper with the reactive amine (hydrazide) black ink. These had an optical density ranging from 0.9 to 1.1.

The paper was passed through the printer again to overcoat the first two bars with the reactive polycarbonyl glyoxal ink. The bars treated with ink B are referred to as "bars A/B" and the bars with only black Ink A are referred to as "bars A-only"

This paper was cut in two: one half was placed in a 100° C. oven for 10 minutes (10 minute oven, "oven 10", sample) and the other half was held at room temperature for 10 minutes (room temperature, "RT 10", sample). The A/B bars and the A-only bars were tested for smear as described herein after. The "oven 10" sample was returned to the oven for another 20 minutes (now heated for a total of 30 minutes and referred to as "oven 30") and the RT 10 sample remained at room temperature and is now referred to as "RT 30". Both oven 30 minute and RT 30 samples were tested again for smear.

The smear test consisted of drawing a high lighter pen across the 0.5 inch width of the bar, onto the white, unprinted part of the page. Each test was run separately (at different points on the bar) with either one stroke of the pen; two strokes of the pen, one on top of the other; or three stokes of the pen, each on top of the other. Multiple strokes are a more severe than a single stroke. Two different highlighter pens were used: Hi-Liter® from Avery Dennison Corp. and Zebra® Pen from Zebra Pen Corp. Smear was evaluated by inspecting the unprinted part of the page for the amount of black color transferred by the highlighter strike(s). The following scale was used.

5=Severe smear

4=Moderate to severe smear

3=Moderate smear

2=Slight smear

1=Very slight smear

0=no smear

Less (no) smear, indicated by smaller numbers, is most desirable. The results are tabulated in the table below.

| Printed Bar | Condition | # of pen strokes | Acidic Pen | Alkaline Pen | Optical Density |
|---|---|---|---|---|---|
| A-only | RT 10 | 1 | 4 | 4 | 0.91 |
|  |  | 2 | 4 | 4 |  |
|  |  | 3 | 4 | 4 |  |
| A-only | RT 30 | 1 | 4 | 4 |  |
|  |  | 2 | 4 | 4 |  |
|  |  | 3 | 4 | 4 |  |
| A-only | Oven 10 | 1 | 0 | 0 | 0.91 |
|  |  | 2 | 2 | 2 |  |
|  |  | 3 | 2 | 2 |  |
| A-only | Oven 30 | 1 | 0 | 0 |  |
|  |  | 2 | 2 | 2 |  |
|  |  | 3 | 2 | 2 |  |
| A/B | RT 10 | 1 | 0 | 0 | 1.12 |
|  |  | 2 | 2 | 2 |  |
|  |  | 3 | 2 | 2 |  |
| A/B | RT 30 | 1 | 0 | 0 |  |
|  |  | 2 | 0 | 2 |  |
|  |  | 3 | 2 | 2 |  |
| A/B | Oven 10 | 1 | 0 | 0 | 1.12 |
|  |  | 2 | 0 | 0 |  |
|  |  | 3 | 0 | 0 |  |
| A/B | Oven 30 | 1 | 0 | 0 |  |
|  |  | 2 | 0 | 0 |  |
|  |  | 3 | 0 | 0 |  |

The data demonstrates that the combination of Inks A and B (A/B bar) gave considerably less smear, under comparable conditions, than Ink A alone (A-only bar). With heating the combination of A and B exhibited substantially no smear at all.

The reduction in smear of the A/B prints is taken as evidence of increased durability from crosslinking between the reactive amine and polycarbonyl.

Various other modifications, alterations, additions or substitutions of the compositions and ink sets of this invention will be apparent to those skilled in the art without departing from the spirit and scope of this invention. This invention is not limited by the illustrative embodiments set forth herein, but rather is defined by the following claims.

The invention claimed is:

1. An inkjet ink set comprising at least a first ink and a second ink, wherein,
    a) the first ink comprises a vehicle and a reactive carbonyl-group(s) containing species having at least one reactive carbonyl group;
    b) the second ink comprises a vehicle and a reactive amine group(s) containing species having at least one reactive amine group; and
    c) the reactive carbonyl-group(s) containing species is any one or combination of species depicted in C5-C8 as follows
    (C5) —C(=NR$^1$)R$^1$
    (C6) —C=C(NR$^3$R$^3$)R$^1$
    (C7) —C(—OR$^4$)$_2$R$^1$
    (C8) —C(—OR$^4$)$_2$H;
    and wherein
    R$^1$=C$_1$ to C$_{10}$ alkyl, or aryl group
    R$^3$=C$_1$ to C$_{10}$ alkyl, or aryl group or part of a ring,
    R$^4$=C$_1$ to C$_{10}$ alkyl, or part of a ring;
    and wherein said first ink does not contain said reactive amine group(s) containing species and said second ink does not contain said reactive carbonyl-group(s) containing species.

2. The ink set of claim 1 wherein said first ink comprises a reactive carbonyl-group(s) containing species having at least two reactive carbonyl groups and said second ink comprises a reactive amine group(s) containing species having at least two reactive amine groups.

3. The ink set of claim 1 or 2 wherein either one or both of said first and second inks comprises a colorant.

4. The ink set of claim 1 wherein the reactive carbonyl-group(s) containing species and the reactive amine group(s) containing species are present, independently, as an additive or associated with a colorant in the form of a dispersant adsorbed on a pigment or a species chemically attached to the pigment.

5. The ink set of claim 1 further comprising a third and a fourth ink wherein
   a) said third and fourth ink each independently comprises a reactive carbonyl-group(s) containing species having at least one reactive carbonyl group;
   b) said first, third and fourth inks comprise colorants; and
   c) said second ink is substantially colorless.

6. The ink set of claim 5 wherein said third and fourth ink each independently comprises a reactive carbonyl-group(s) containing species having at least two reactive carbonyl groups.

7. The ink set of claim 1 further comprising a third and a fourth ink wherein
   a) said third and fourth ink each independently comprises a reactive amine groups containing species having at least one reactive amine groups;
   b) said second, third and fourth inks comprise colorants; and
   c) said first ink is substantially colorless.

8. The ink set of claim 7 wherein said third and fourth ink each independently comprises a reactive amine group(s) containing species having at least two reactive amine groups.

9. The ink set according to any one of claims 5 to 8 wherein the first, third and fourth inks are cyan, yellow, and magenta colored inks.

10. The ink set according to claim 1, wherein the reactive amine group(s) containing species is any one or combination of species depicted in A1-A5 as follows
   (A1) $R-NH-NH_2$
   (A2) $R-C(=O)-NH-NH_2$
   (A3) $R''R'C=N-NH_2$
   (A4) $R-NH-C(=O)-NH-NH_2$
   (A5) $R'''NH-NH-C(=O)NH-NH_2$
   and wherein
   R, R', and R''=alkyl or aryl linkage to multifunctional reactive amine species, and
   R'''=H, or alkyl or aryl linkage to multifunctional reactive amine species.

11. A method for ink jet printing onto a substrate, comprising:
   (a) providing an ink jet printer that is responsive to digital data signals;
   (b) loading the printer with a substrate to be printed;
   (c) loading the printer with an ink set according to claim 10; and
   (d) printing onto the substrate using the ink set in response to the digital data signals.

12. The method of claim 11 wherein printing onto the substrate includes at least some printed area of overlap between an ink comprising a reactive carbonyl-group(s) containing species and an ink comprising a reactive amine group(s) containing species.

13. The method of claim 11 further comprising the step of heating the printed substrate to accelerate the reaction of the reactive carbonyl-group(s) containing species with the reactive amine group(s) containing species.

* * * * *